United States Patent
Fujishiro et al.

(10) Patent No.: US 10,694,492 B2
(45) Date of Patent: Jun. 23, 2020

(54) RADIO TERMINAL, BASE STATION, AND METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/521,022

(22) Filed: Jul. 24, 2019

(65) Prior Publication Data

US 2019/0349883 A1 Nov. 14, 2019

Related U.S. Application Data

(63) Continuation of application No. PCT/JP2018/003617, filed on Feb. 2, 2018.

(60) Provisional application No. 62/454,177, filed on Feb. 3, 2017.

(51) Int. Cl.
H04W 68/00 (2009.01)
(52) U.S. Cl.
CPC ................. H04W 68/00 (2013.01)
(58) Field of Classification Search
CPC .................................................. H04W 68/00
USPC ....................................................... 455/458
See application file for complete search history.

(56) References Cited

U.S. PATENT DOCUMENTS

2008/0070498 A1  3/2008  Tan et al.
2017/0311247 A1* 10/2017  Qi ......................... H04W 68/04
2017/0332419 A1* 11/2017  Kim ....................... H04L 1/1861
2018/0049120 A1*  2/2018  Kelley ................... H04W 76/27
2018/0376452 A1* 12/2018  Wei ........................ H04W 76/28
2019/0230625 A1*  7/2019  Kim ......................... H04W 8/02

OTHER PUBLICATIONS

3GPP TSG RAN R2-168031 (Nov. 2016) (Year: 2016).*
3GPP TSG RAN R2-168032 (Nov. 2016) (Year: 2016).*
3GPP TSG RAN R3-162482 (Oct. 2016) (Year: 2016).*
3GPP TSG RAN R3-162756 (Nov. 2016) (Year: 2016).*
3GPP TSG RAN R3163244 (Nov. 2016) (Year: 2016).*
3GPP WG2 Meeting S2-170051 (Jan. 2017) (Year: 2017).*
3GPP WG2 Meeting S2-170052 (Jan. 2017) (Year: 2017).*
CATT, "Discussion on open issues for LC", 3GPP TSG RAN WG3 Meeting #94, R3-162702, Nov. 14-18, 2016, pp. 1-7, Reno, NV, USA.

(Continued)

Primary Examiner — William Nealon
(74) Attorney, Agent, or Firm — Studebaker & Brackett PC

(57) ABSTRACT

A base station used in a mobile communication system, includes: a controller configured to cause a user equipment to transition to a specific state in which a paging area is configured in the user equipment from the base station, perform a paging for the user equipment by the base station with another base station that are correspond to the paging area, when the base station receives a non-access stratum signaling from a core network to the user equipment, and transmit a failure notification from the base station to the core network in response to failing to the paging. The failure notification comprises an identifier for identifying the user equipment, and information indicating a cause of failure of the paging.

2 Claims, 14 Drawing Sheets

(56) References Cited

OTHER PUBLICATIONS

Qualcomm Incorporated, "Light Connection Model Analysis", 3GPP TSG RAN WG3 Meeting #94, R3-162833, Nov. 14-18, 2016, pp. 1-8, Reno, NV, USA.
Kyocera; "Further Consideration of Modeling for Light Connection"; 3GPP TSG-RAN WG2 #96; R2-168031; Nov. 14-18, 2016; pp. 1-6; Reno, NV, USA.
Kyocera; "Consideration of RAN-Initiated Paging for Light Connection"; 3GPP TSG-RAN WG2 #96; R2-168032; Nov. 14-18, 2016; pp. 1-5; Reno, NV, USA.
Qualcomm Incorporated; "Paging and Mobility Procedures in Light Connection"; 3GPP TSG-RAN WG3 Meeting #93bis; R3-162482; Oct. 10-14, 2016; pp. 1-6; Sophia Antipolis, France.
Huawei et al.; "Introduction of Light Connection in S1AP"; 3GPP TSG-RAN WG3 Meeting #94; R3-163244; Nov. 14-18, 2016; pp. 1-20; Reno, NV, USA.
Huawei, China Unicom, "Consideration of Light connection open issues", 3GPP TSG-RAN3 Meeting #94, R3-162756, Nov. 14-18, 2016, 6 pages, Reno, Nevada, USA.
Huawei, HiSILLICON, "Discussion on SA2 required work on Light Connection", SA WG2 Meeting #118bis, S2-170051, Jan. 16-20, 2017, 8 pages, Spokane, Washington, USA.

\* cited by examiner

RADIO TERMINAL, BASE STATION, AND METHOD

RELATED APPLICATION

This application is a continuation application of international application PCT/JP2018/003617, filed Feb. 2, 2018, which claims the benefit of U.S. Provisional Application No. 62/454,177 filed Feb. 3, 2017, the entire contents of which are incorporated herein by reference.

TECHNICAL FIELD

The present disclosure relates to a radio terminal, a base station, and a method used in a mobile communication system.

BACKGROUND ART

In recent years, with the spread of radio terminals such as smartphones that can execute a large number of applications, the frequency at which radio terminals are connected to a network and the frequency at which a network performs paging of radio terminals have been increasing.

For this reason, in the mobile communication system, a network load associated with signaling is increasing. Under such circumstances, in 3rd generation partnership project (3GPP) which is a standardization project of a mobile communication system, technology for reducing signaling is under review.

SUMMARY

A base station according to an embodiment is used in a mobile communication system. The base station includes a controller configured to cause a user equipment to transition to a specific state in which a paging area is configured in the user equipment from the base station, perform a paging for the user equipment by the base station with another base station that are correspond to the paging area, when the base station receives a non-access stratum signaling from a core network to the user equipment, and transmit a failure notification from the base station to the core network in response to failing to the paging. The failure notification comprises an identifier for identifying the user equipment, and information indicating a cause of failure of the paging.

A radio terminal according to an embodiment is used in a mobile communication system. The radio terminal includes: a controller configured to determine, in a specific state in which paging area information indicating a paging area used in a first paging scheme initiated by a base station is configured in the radio terminal, whether or not a current serving cell has a function of handling the specific state. The controller performs, when the current serving cell does not have the function, at least one process of a first process of determining that a procedure for requesting recovery from the specific state is unable to be performed in the current serving cell, a second process of transitioning to an RRC idle mode, and a third process of monitoring paging using a second paging scheme initiated by a core network.

A radio terminal according to an embodiment is used in a mobile communication system. The radio terminal includes: a controller configured to determine, in a specific state in which paging area information indicating a paging area used in a first paging scheme initiated by a base station is configured in the radio terminal, whether or not a neighboring cell in moving destination of the radio terminal has a function of handling the specific state. The radio terminal includes a transmitter configured to transmit a resume request message to the current serving cell before performing a cell reselection for changing a serving cell of the radio terminal from the current serving cell to the neighboring cell, when the neighboring cell does not have the function. The resume request message is a message for requesting a resume from the specific state.

A base station according to an embodiment is used in a mobile communication system. The base station includes a controller configured to performs the first paging for the radio terminal using the first paging scheme initiated by the base station. The controller determines that the RAN paging is unlikely to reach the radio terminal, the controller give a notification indicating predetermined information causing the radio terminal to start the second paging to the core network. The controller gives a notification indicating predetermined information to the core network at a timing before the RAN paging is executed or while the RAN paging is being.

A base station according to an embodiment is used in a mobile communication system. The base station includes a controller configured to perform paging for a radio terminal using a paging scheme initiated by the base station. In the paging scheme initiated by the base station, the controller performs a process of transmitting a paging message to the radio terminal using identification information for identifying the radio terminal. The controller acquires the identification information by receiving a UE CONTEXT MODIFICATION REQUEST message including the identification information from a core network.

DESCRIPTION OF EMBODIMENTS (Mobile Communication System)

Figure 1:
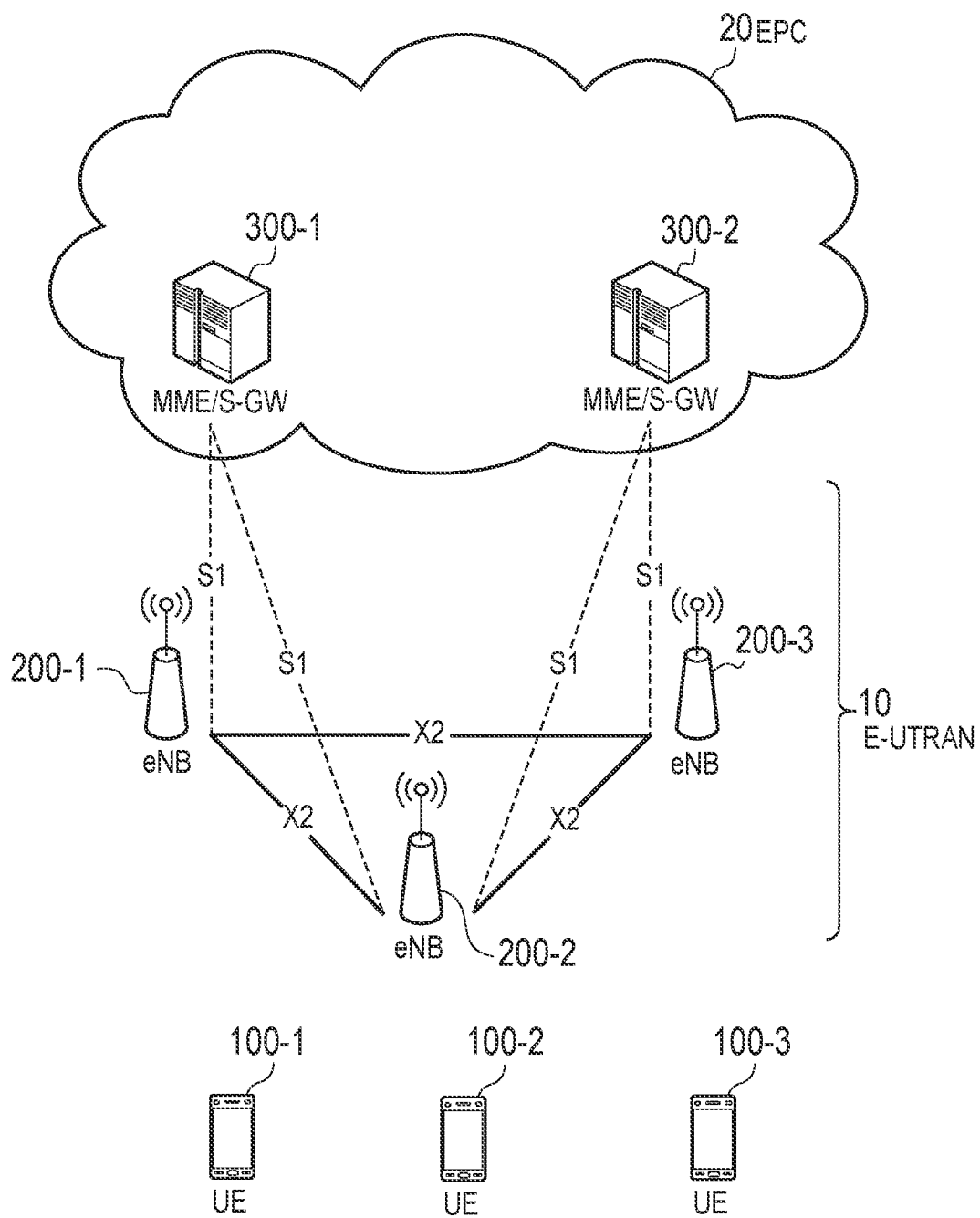
FIG. 1 is a diagram illustrating a configuration of an LTE system according to an embodiment.

A configuration of a mobile communication system according to an embodiment will be described. FIG. 1 is a diagram illustrating a configuration of a Long Term Evolution (LTE) system which is a mobile communication system according to an embodiment. The LTE system is a mobile communication system based on the 3GPP standard.

The LTE system includes a radio terminal (user equipment (UE)) 100, a radio access network (evolved-UMTS terrestrial radio access network (E-UTRAN)) 10, and a core network (evolved packet core (EPC)) 20.

The UE 100 is a mobile communication apparatus. The UE 100 performs radio communication with an eNB 200 that manages a cell (serving cell) in which the UE 100 exists.

The E-UTRAN 10 includes base stations (evolved Node-Bs (eNBs)) 200. The eNBs 200 are connected to each other via an X2 interface. The eNB 200 manages one or more cells. The eNB 200 performs radio communication with the UE 100 that has established a connection with its own cell. The eNB 200 has a radio resource management (RRM) function, a routing function of user data (hereinafter referred to simply as "data"), a measurement control function for mobility control and scheduling, and the like. A "cell" is used as a term indicating the smallest unit of a radio communication area. The "cell" is also used as a term indicating a function or resource for performing radio communication with the UE 100.

The EPC 20 includes a mobility management entity (MME) and a serving gateway (S-GW) 300. The MME performs various types of mobility control and the like on the UE 100. The MME manages information of a tracking area (TA) in which the UE 100 exists by communicating with the UE 100 using non-access stratum (NAS) signaling. The tracking area is an area including a plurality of cells. The S-GW performs data transfer control. The MME and the S-GW are connected with the eNB 200 via an S1 interface.

Figure 2:
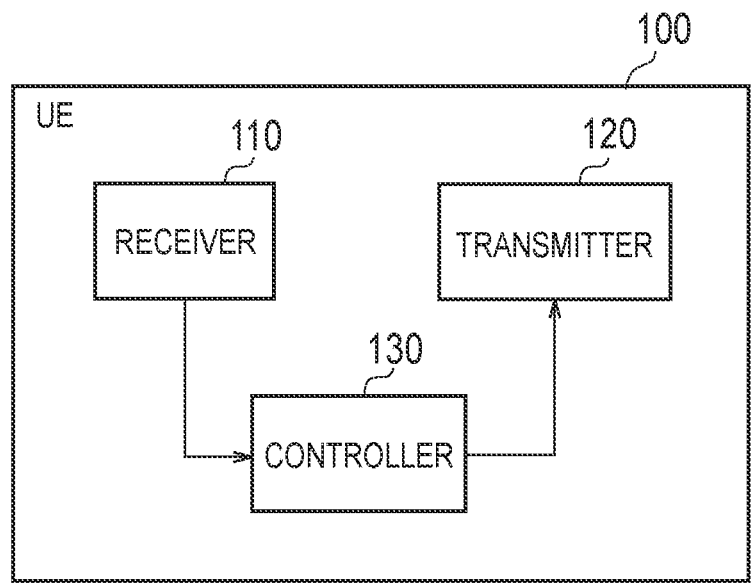
FIG. 2 is a diagram illustrating a configuration of a UE (radio terminal) according to an embodiment.

FIG. 2 is a diagram illustrating the configuration of UE 100 (radio terminal). The UE 100 includes a receiver 110, a transmitter 120, and a controller 130.

The receiver 110 performs various types of reception under the control of the controller 130. The receiver 110 includes an antenna and a receiving section. The receiving section converts a radio signal received by the antenna into a baseband signal (reception signal) and outputs it to the controller 130.

The transmitter 120 performs various types of transmission under the control of the controller 130. The transmitter 120 includes an antenna and a transmitting section. The transmitting section converts a baseband signal (transmission signal) output from the controller 130 into a radio signal and transmits it from the antenna.

The controller 130 performs various types of controls in the UE 100. The controller 130 includes at least one processor and a memory. The memory stores a program executed by the processor and information used in a process by the processor. The processor may include a baseband processor and a central processing unit (CPU). The baseband processor performs modulation/demodulation, encoding/decoding, and the like of baseband signals. The CPU executes the program stored in the memory to perform various types of processes. The processor executes a process to be described later.

Figure 3:
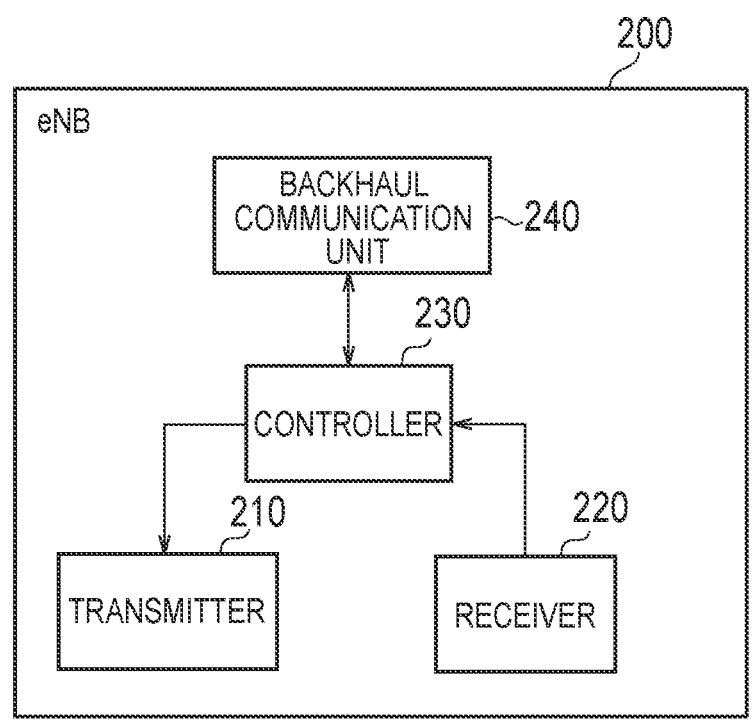
FIG. 3 is a diagram illustrating a configuration of an eNB (base station) according to an embodiment.

FIG. 3 is a diagram illustrating a configuration of the eNB 200 (base station). The eNB 200 includes a transmitter 210, a receiver 220, a controller 230, and a backhaul communication unit 240.

The transmitter 210 performs various types of transmission under the control of the controller 230. The transmitter 210 includes an antenna and a transmitting section. The transmitting section converts a baseband signal (transmission signal) output from the controller 230 into a radio signal and transmits it from the antenna.

The receiver 220 performs various types of reception under the control of the controller 230. The receiver 220 includes an antenna and a receiving section. The receiving section converts a radio signal received by the antenna into a baseband signal (received signal) and outputs it to the controller 230.

The controller 230 performs various types of controls in the eNB 200. The controller 230 includes at least one processor and a memory. The memory stores a program executed by the processor and information used in the process by the processor. The processor may include a baseband processor and a CPU. The baseband processor performs modulation/demodulation, coding/decoding, and the like of baseband signals. The CPU executes the program stored in the memory to perform various types of processes. The processor executes a process to be described later.

The backhaul communication unit 240 is connected to a neighbor eNB via the X2 interface. The backhaul communication unit 240 is connected to the MME/S-GW 300 via the S1 interface. The backhaul communication unit 240 is used for communication performed on the X2 interface and communication performed on the S1 interface.

The MME includes a controller and a network communication unit. The controller performs various types of controls in the MME. The controller includes at least one processor and memory. The memory stores a program executed by the processor and information used in the process by the processor. The processor may include a baseband processor and a CPU. The baseband processor performs modulation/demodulation, coding/decoding, and the like of baseband signals. The CPU executes the program stored in the memory to perform various types of processes. The processor executes a process to be described later. The network communication unit is connected to the eNB 200 via the S1 interface. The network communication unit is used for communication performed on the S1 interface.

Figure 4:
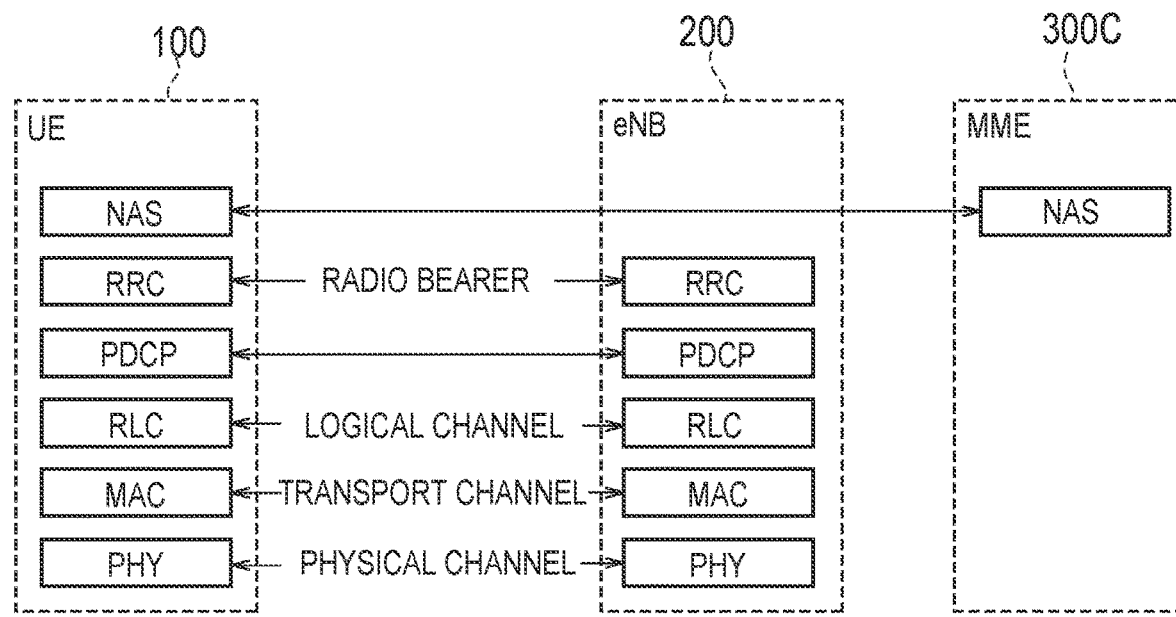
FIG. 4 is a diagram illustrating a configuration of a protocol stack of a radio interface in an LTE system according to an embodiment.

FIG. 4 is a diagram illustrating a configuration of a protocol stack of a radio interface in an LTE system. As illustrated in FIG. 4, a radio interface protocol is divided into first to third layers of an OSI reference model. The first layer is a physical (PHY) layer. The second layer includes a medium access control (MAC) layer, a radio link control (RLC) layer, and a packet data convergence protocol (PDCP) layer. The third layer contains a radio resource control (RRC) layer. The PHY layer, the MAC layer, the RLC layer, the PDCP layer, and the RRC layer constitute an access stratum (AS) layer.

The PHY layer performs encoding and decoding, modulation and demodulation, antenna mapping and demapping, and resource mapping and demapping. Data and control information are transmitted between the PHY layer of the UE 100 and the PHY layer of the eNB 200 via a physical channel.

The MAC layer performs data priority control, a retransmission process by hybrid ARQ (HARQ), a random-access procedure, and the like. Data and control information are transmitted between the MAC layer of the UE 100 and the MAC layer of the eNB 200 via a transport channel. The MAC layer of the eNB 200 includes a scheduler. The scheduler decides transport formats (transport block sizes and modulation and coding schemes (MCSs)) of an uplink and a downlink, and resource blocks allocated to the UE 100.

The RLC layer transmits data to the RLC layer on the reception side using the functions of the MAC layer and the PHY layer. Data and control information are transmitted between the RLC layer of UE 100 and the RLC layer of eNB 200 via a logical channel.

The PDCP layer performs header compression/decompression and encryption/decryption.

The RRC layer is defined only in a control plane that handles control information. RRC signaling for various types of settings is transmitted between the RRC layer of the UE 100 and the RRC layer of the eNB 200. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode.

The NAS layer located above the RRC layer performs session management, mobility management, and the like. NAS signaling is transmitted between the NAS layer of UE 100 and the NAS layer of an MME 300C. The UE 100 has a function of an application layer or the like in addition to the radio interface protocol.

Figure 5:
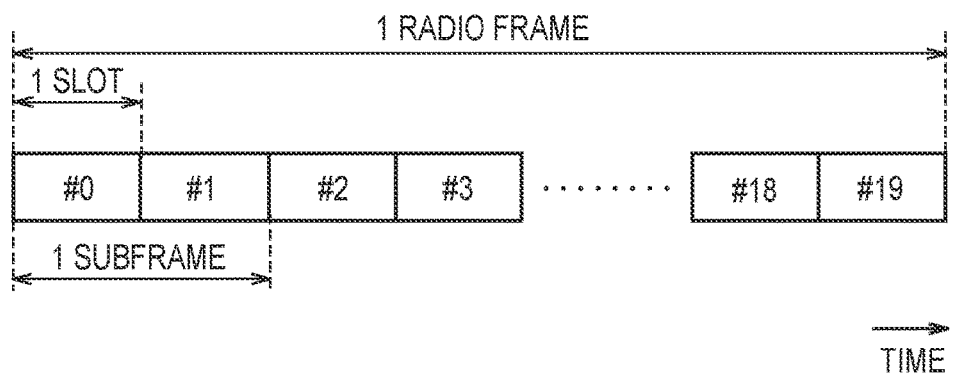
FIG. 5 is a diagram illustrating a configuration of a radio frame used in an LTE system according to an embodiment.

FIG. 5 is a diagram illustrating a configuration of a radio frame used in the LTE system. The radio frame includes ten sub frames on a time axis. Each sub frame includes two slots on the time axis. The length of each sub frame is 1 ms. The length of each slot is 0.5 ms. Each sub frame includes a plurality of resource blocks (RBs) on a frequency axis. Each sub frame includes a plurality of symbols on the time axis. Each resource block includes a plurality of sub carriers on the frequency axis. Specifically, an RB is constituted by 12 sub carriers and 1 slot. A resource element (RE) is constituted by one symbol and one sub carrier. Among radio resources (time and frequency resources) allocated to the UE 100, frequency resources can be specified by resource blocks, and time resources can be specified by sub frames (or slots).

In downlink, an interval of several symbols in the head of each sub frame is an area used as a physical downlink control channel (PDCCH) for transmitting downlink control information mainly. The remaining part of each sub frame is an area which can be used as a physical downlink shared channel (PDSCH) for transmitting downlink data mainly.

In uplink, both ends of each sub frame in the frequency direction are areas used as a physical uplink control channel (PUCCH) for transmitting uplink control information mainly. The remaining part of each sub frame is an area which can be used as a physical uplink shared channel (PUSCH) for transmitting uplink data mainly.

(Specific State)

A specific state according to an embodiment will be described. The specific state is a state in which signaling for the UE 100 is suppressed while an S1 connection for the UE 100 is being maintained. The S1 connection is also referred to as an S1 bearer. The S1 connection is a connection established between the eNB 200 and the EPC 20 on the S1 interface. The S1 interface includes an S1-U interface for the user plane and an S1-MME interface for the control plane.

The S1 connection may include an S1-U connection established between the eNB 200 and the S-GW on the S1-U interface and an S1-MME connection established between the eNB 200 and the MME on the S1-C interface.

The specific state may be one state out of the RRC connected mode or one state of the RRC idle mode. According to the specific state, signaling is reduced as compared to a general RRC connected mode. According to the specific state, the UE 100 can start data communication more quickly than in the general RRC idle mode. Hereinafter, the specific state is referred to as a "Light Connection state (Light Connection sub state)." A case in which the specific state is one state of the RRC connected mode is referred to as a "modeling A." A case in which the specific state is one state of the RRC idle mode is referred to as a "modeling B."

RAN paging is applied to the UE 100 in the Light Connection state. The RAN paging is performed in units of RAN paging areas in which paging is controlled by the E-UTRAN 10 (the eNB 200). The RAN paging area may be an area narrower than the tracking area. By introducing the RAN paging area, it is possible to reduce the number of cells in which paging is performed for one UE 100. Therefore, it is possible to reduce signaling. As an example, the RAN paging area is constituted by a cell of an anchor eNB that maintains the S1 connection of the UE 100 in the Light Connection state and a cell of the eNB 200 nearby the anchor eNB. The nearby eNB 200 may be an eNB 200 having an X2 interface with the anchor eNB. If the anchor eNB receives data or NAS signaling addressed to the UE 100 in the Light Connection state from the MME/S-GW 300, the anchor eNB may determine to perform RAN paging and perform paging of the UE 100 together with the nearby eNB 200. The paging may be performed by transmitting an RRC paging message.

A basic operation related to the Light Connection state will be described below.

The UE 100 supporting the Light Connection state (Light Connection operation) gives a notification indicating the support for the Light Connection state (Light Connection operation) in UE capability information (UE-EUTRA-Capability).

The UE 100 transitions to the Light Connection state in accordance with RRC signaling. Specifically, the UE 100 is configured to the Light Connection state in accordance with unicast RRC signaling (an RRC reconfiguration message or an RRC release message).

The S1 connection of the UE 100 in the Light Connection state is maintained in the "anchor eNB" and is active. The anchor eNB may be an eNB 200 which causes the UE 100 transition to the Light Connection state. When the UE 100 moves to another RAN paging area, the anchor eNB may be switched.

The Light Connection state is an EPS Connection Management (ECM) connection state from a point of view of a network. The ECM indicates the connection state between the UE 100 and the core network (MME).

For UE 100 in the Light Connection state, paging (RAN paging) can be performed by activation of the RAN (the E-UTRAN 10). The RAN paging may be initiated by the anchor eNB. The RAN paging area is constituted by one cell or a plurality of cells. The plurality of cells may be managed by different eNBs. The paging message is defined by reusing the general RRC paging message.

A paging process (RAN paging) is controlled by the anchor eNB.

The RAN paging area can be configured to be specific to the UE. The UE-specific RAN paging area is configured in the UE 100 from the eNB 200 by unicast signaling or broadcast signaling. The RAN paging area is designated by a cell list or a paging area ID. The RAN paging area may be a single cell. The RAN paging area may be the same area as the tracking area.

The UE 100 in the Light Connection state executes a cell reselection mechanism similar to the RRC idle mode.

Context information (UE AS context) of the UE 100 in the Light Connection state is maintained in both the UE and the anchor eNB.

When the UE 100 in the Light Connection state detects paging or starts data transmission, the UE 100 recovers a connection with the eNB 200. Alternatively, the UE 100 may transition to the RRC connected mode.

The UE 100 in the Light Connection state gives a notification to the network when the UE 100 moves out of the configured RAN paging area.

The UE 100 in the Light Connection state performs a DRX operation using a parameter similar to a DRX operation in the RRC idle mode. A parameter for deciding paging opportunities may include an ID of the UE (for example, an IMSI, an S-TMSI, a Resume ID, or the like).

The UE 100 in the Light Connection state transitions to an operation of the general RRC connected mode in accordance with an RRC procedure. In the modeling A, the procedure is an RRC recovery (resume) procedure or an RRC reestablishment procedure. In the modeling B, the procedure is an RRC recovery (resume) procedure.

First Embodiment

A first embodiment will be described on the premise of the mobile communication system described above.

In the first embodiment, a scenario in which each eNB 200 (or each cell) transmits an identifier of the RAN paging area to which each eNB 200 (or each cell) belongs through broadcast signaling is assumed. In such a scenario, a method in which the eNB 200 transmits the RAN paging area identifier configured in the UE 100 through unicast signaling may be considered.

However, such a method is likely to increase the processing load for managing the RAN paging area identifier since the eNB 200 explicitly configures the RAN paging area identifier in the UE 100. Also, the eNB 200 may configure the identifier of the RAN paging area not including the cell in which the UE 100 exists in the UE 100. In this case, when the UE 100 is in the Light Connection state, it is necessary for the UE 100 to give a notification to the network immediately because the UE 100 is outside the configured RAN paging area. The first embodiment is an embodiment that makes it possible to solve such problems.

The UE 100 (the receiver 110) according to the first embodiment receives unicast signaling that causes the UE 100 to transition to the Light Connection state from the eNB 200 via a serving cell. The UE 100 (the controller 130) transitions to the Light Connection state in response to the reception of the unicast signaling. The Light Connection state is a state in which the RAN paging area identifier indicating the RAN paging area in which paging is managed by the RAN including the eNB 200 is configured in the UE 100. Even though the RAN paging area identifier is not included in the unicast signaling, the UE 100 (the controller 130) holds an identifier of a predetermined area as the RAN paging area identifier configured in the UE 100 in the Light Connection state. The predetermined area is the serving cell or the RAN paging area to which the serving cell belongs.

According to the first embodiment, even though the eNB 200 does not explicitly configure the RAN paging area identifier in the UE 100, the UE 100 recognizes the serving cell when the UE 100 transitions to the Light Connection state or the RAN paging area to which the serving cell belongs as the RAN paging area configured in the UE 100 itself. That is, the serving cell when the UE 100 transitions to the Light Connection state or the RAN paging area to which the serving cell belongs is implicitly configured as the RAN paging area applied to the UE 100. Accordingly, it is possible to solve the problem in the case in which the eNB 200 explicitly configures the RAN paging area identifier in the UE 100.

In an operation pattern 1 of the first embodiment, the UE 100 (the receiver 110) receives, from the eNB 200, broadcast signaling including the identifier of the RAN paging area to which the serving cell belongs. The UE 100 (the controller 130) holds the identifier in the broadcast signaling as the RAN paging area identifier configured in the UE 100 in the Light Connection state.

In an operation pattern 2 of the first embodiment, unicast signaling indicating transition to the Light Connection state includes information indicating that the RAN paging area configured in the UE 100 includes only the current serving cell. The UE 100 (the controller 130) holds the identifier of the serving cell as the RAN paging area identifier configured in the UE 100 in the Light Connection state. According to the operation pattern 2, when the RAN paging area includes only one cell, it is possible to make it unnecessary to configure the RAN paging area explicitly in the UE 100. Further, when the cell identifier is used as the RAN paging area identifier, it is possible to prevent the RAN paging area identifier from being exhausted. The cell identifier is, for example, a physical cell ID (PCI) or an E-UTRAN cell global ID (ECGI). The PCI is specified on the basis of a synchronization signal transmitted from the eNB 200. The ECGI is included in a SIB transmitted from the eNB 200.

In the first embodiment, the UE 100 (the controller 130) determines, in the Light Connection state, whether or not the UE 100 has moved to another cell not belonging to the RAN paging area (a predetermined area) configured in the UE 100. In response to the determination indicating that the UE 100 has moved to the other cell, the UE 100 (the controller 130) transmits a notification to the other cell.

Operation Pattern 1

Figure 6:
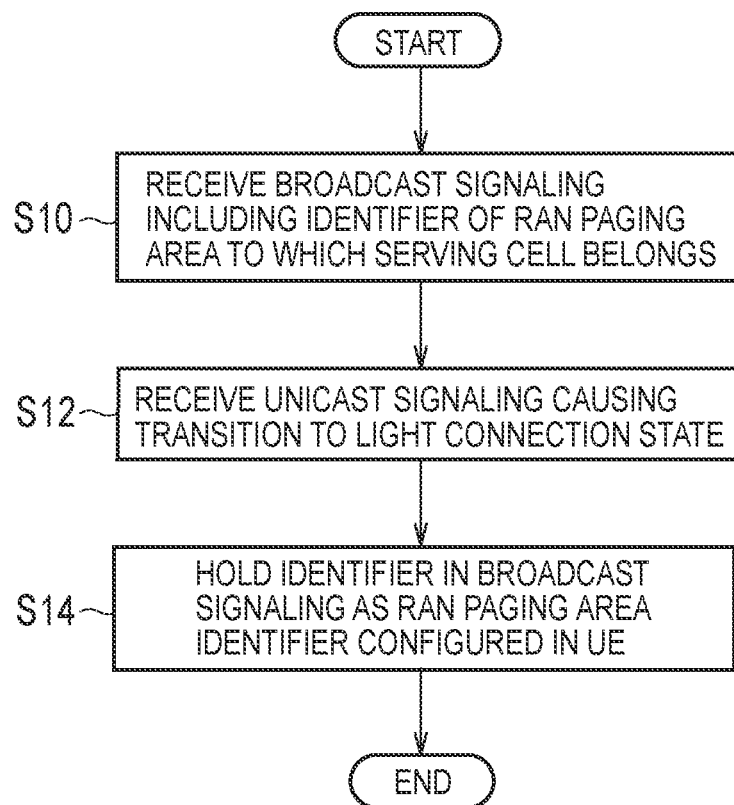
FIG. 6 is a diagram illustrating an operation example of a UE according to an operation pattern 1 of a first embodiment.

FIG. 6 is a diagram illustrating an operation example of the UE 100 according to the operation pattern 1 of the first embodiment.

In step S10, the UE 100 (the receiver 110) receives, from the serving cell, broadcast signaling including the identifier of the RAN paging area to which the serving cell belongs. The broadcast signaling may be broadcast RRC signaling (system information block (SIB)). The UE 100 (the controller 130) stores the identifier of the RAN paging area to which the serving cell belongs.

In step S12, the UE 100 (the receiver 110) receives, from the serving cell, unicast signaling that causes transition to the Light Connection state. The unicast signaling may be unicast RRC signaling (the RRC reconfiguration message or the RRC release message).

In step S14, the UE 100 (the controller 130) transitions to the Light Connection state. Also, the UE 100 holds an identifier in the broadcast signaling (that is, the RAN paging area identifier received in step S10) as the RAN paging area identifier configured in the UE 100.

As described above, when the UE 100 receives an instruction (the RRC Connection Reconfiguration or Release message) to transition to the Light Connection state, the UE 100 reads the RAN paging area identifier being currently broadcast or reads the RAN paging area identifier being already held if the RAN paging area identifier is valid and holds the RAN paging area identifier as the RAN paging area identifier allocated to the UE 100 itself. The RAN paging area identifier may be stored in a variable held by the UE 100.

Figure 7:
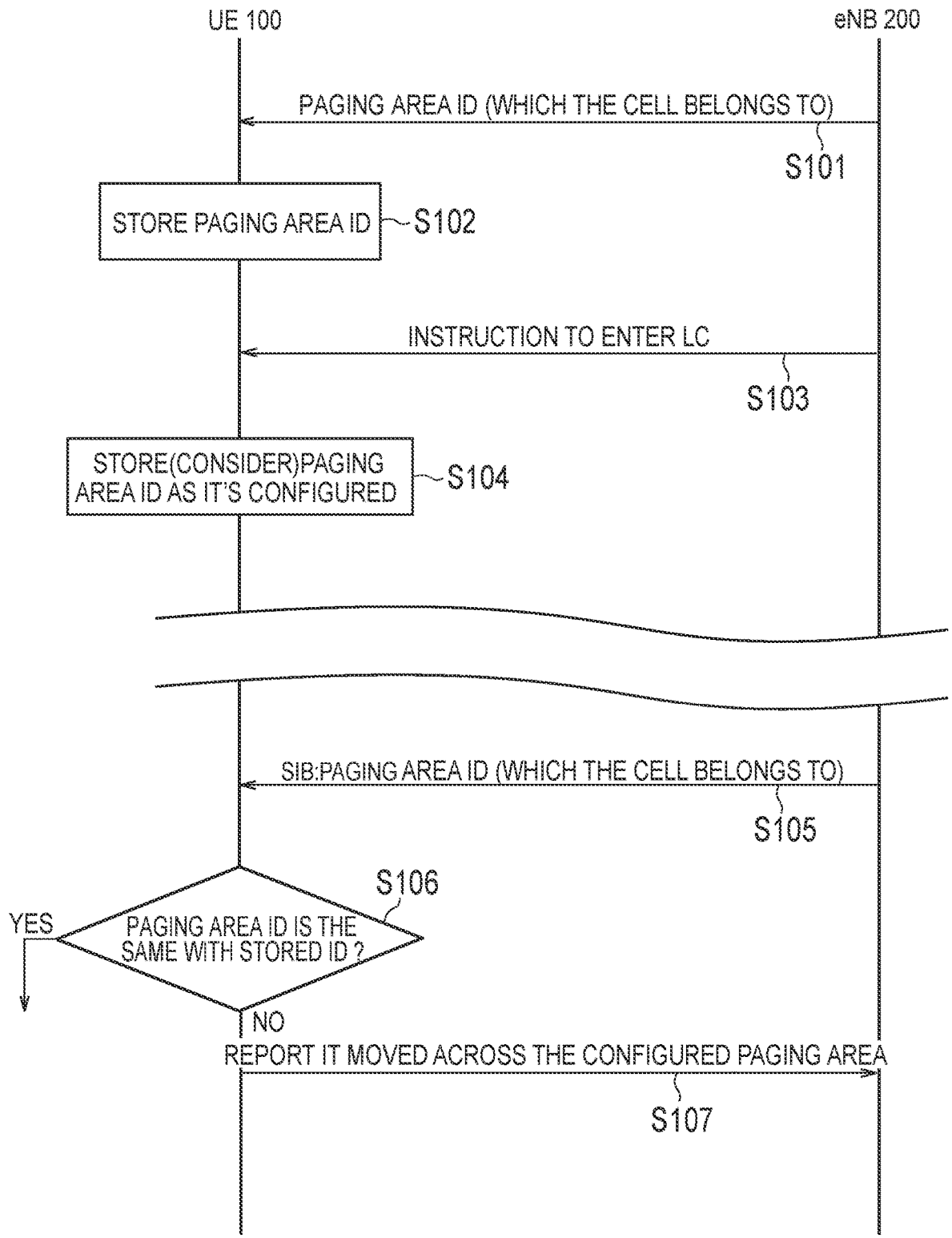
FIG. 7 is a diagram illustrating an operation sequence example according to the operation pattern 1 of the first embodiment.

FIG. 7 is a diagram illustrating an operation sequence example according to the operation pattern 1 of the first embodiment.

In step S101, the eNB 200 transmits the SIB including the RAN paging area identifier (Paging Area ID) to which its own cell (or its own eNB) belongs. The UE 100 receives the SIB.

In step S102, the UE 100 stores the RAN paging area identifier (Paging Area ID) in the SIB.

In step S103, the eNB 200 transmits, to the UE 100, unicast signaling that causes the UE 100 to transition to the Light Connection state (Instruction to enter LC). The UE 100 is in the RRC connected mode when the unicast signaling is received.

In step S104, the UE 100 transitions to the Light Connection state, and holds the identifier (that is, the RAN paging area identifier stored in step S102) in the SIB as the RAN paging area identifier configured in the UE 100 itself. In other words, the UE 100 regards the RAN paging area identifier in the SIB as the RAN paging area identifier configured in the UE 100 itself.

Thereafter, the UE 100 continues to stay in the cell in which the UE 100 transitions to the Light Connection state or moves from the cell in which the UE 100 transitions to the Light Connection state to another cell. Here, a case in which the UE 100 moves from the cell in which the UE 100 transitions to the Light Connection state to another cell is mainly assumed. The UE 100 reselects the other cell using a cell reselection mechanism similar to the RRC idle mode.

In step S105, the eNB 200 transmits the SIB including the RAN paging area identifier (Paging Area ID) to which its own cell (or its own eNB) belongs. The UE 100 receives the SIB.

In step S106, the UE 100 reads out the held RAN paging area identifier, and compares it with the RAN paging area identifier broadcast from the current (new) cell (that is, the RAN paging area identifier received in step S105).

When the identifiers are different (step S106: No), in step S107, the UE 100 transmits a notification indicating that the UE 100 has moved out of the RAN paging area configured in the UE 100 itself (Report it moved across the configured paging area) to a current (new) cell. On the other hand, when "Yes" is determined in step S106, the UE 100 does not give the notification.

Operation Pattern 2

Figure 8:
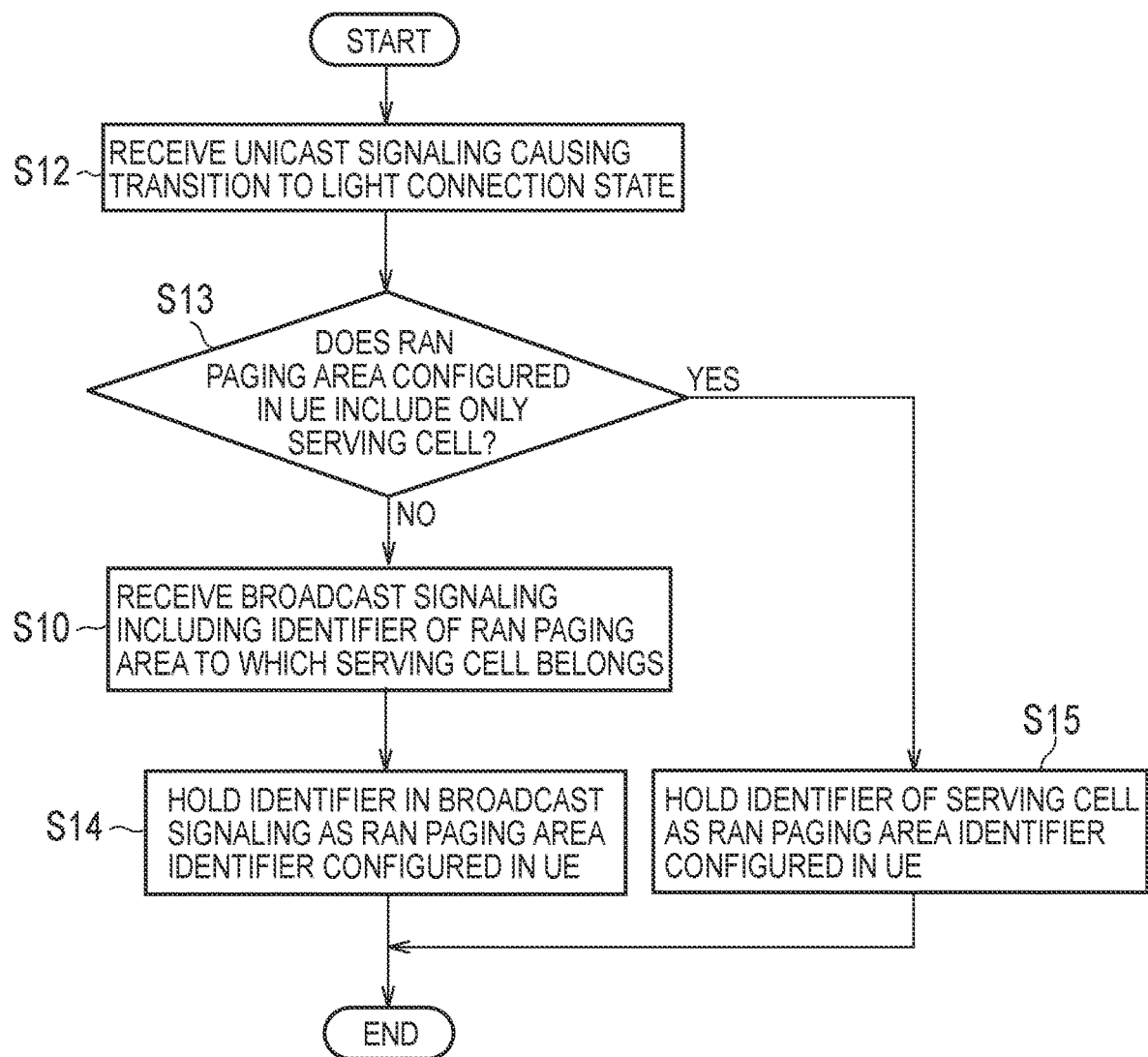
FIG. 8 is a diagram illustrating an operation example of a UE according to an operation pattern 2 of the first embodiment.

FIG. 8 is a diagram illustrating an operation example of the UE 100 according to the operation pattern 2 of the first embodiment. In FIG. 8, processes similar to those in the operation pattern 1 illustrated in FIG. 6 are assigned the same step numbers as in FIG. 6.

In step S12, the UE 100 (the receiver 110) receives, from the serving cell, unicast signaling that causes the UE 100 to transition to the Light Connection state. The unicast signaling may be unicast RRC signaling (the RRC reconfiguration message or the RRC release message). In the operation pattern 2, the unicast signaling includes information indicating whether or not the RAN paging area configured in the UE 100 includes only the current serving cell.

In step S13, the UE 100 (the controller 130) determines, on the basis of the information included in the unicast signaling, whether or not the RAN paging area configured in the UE 100 itself includes only the current serving cell.

If "NO" is determined in step S13, in step S10, the UE 100 (the receiver 110) receives, from the serving cell, broadcast signaling including the identifier of the RAN paging area to which the serving cell belongs. The broadcast signaling may be broadcast RRC signaling (system information block (SIB)). The UE 100 (the controller 130) stores the received RAN paging area identifier. Then, in step S14, the UE 100 (the controller 130) transitions to the Light Connection state, and holds the identifier in the broadcast signaling (that is, the RAN paging area identifier received in step S10) as the RAN paging area identifier configured in the UE 100.

If "YES" is determined in step S13, in step S15, the UE 100 (the controller 130) transitions to the Light Connection state, and holds the identifier (the cell identifier) of the current serving cell as the RAN paging area identifier configured in the UE 100. The UE 100 may hold information indicating that the RAN paging area configured in the UE 100 includes only the current serving cell.

First Modified Example of First Embodiment

A first modified example of the first embodiment will be described mainly with differences from the first embodiment.

A basic operation of the UE 100 according to the modified example of the first embodiment is similar to that of the first embodiment. The UE 100 (the receiver 110) receives, from the eNB 200, a unicast signal that causes the UE 100 to transition to the Light Connection state (the specific state). The UE 100 (the receiver 110) further receives the RAN paging area identifier broadcast by the eNB 200. The UE 100 (the controller 130) causes the UE 100 to transition to the Light Connection state in response to the reception of the unicast signal. The Light Connection state is a state in which paging area information indicating a paging area used in an eNB-initiated paging scheme (that is, RAN paging) is configured in the UE 100. The paging area information is also referred to as a paging area configuration.

In the modified example of the first embodiment, the UE 100 (the controller 130) holds the RAN paging area identifier as the paging area information configured in the UE 100 (the controller 130) when a predetermined condition is satisfied. The predetermined condition may be one of the following first to third conditions or may be a combination of two or more conditions.

The first condition is a condition that the RAN paging area identifier is broadcast from the eNB 200. When the RAN paging area identifier is broadcast from the eNB 200, the UE 100 recognizes that the RAN paging area identifier is designated as the paging area information from the eNB 200.

The second condition is a condition that the RAN paging area identifier is designated as the paging area information from the eNB 200. Such designation may be performed by the unicast signal (for example, the RRC Connection Release message) that causes the transition to the Light Connection state. For example, when the RRC Connection Release message includes information such as "ranpagingAreaId=TRUE," the UE 100 recognizes that the RAN paging area identifier is designated as the paging area information from the eNB 200.

The third condition is a condition that information other than the RAN paging area identifier is not designated as the paging area information from the eNB 200. The information other than the RAN paging area identifier is, for example, at least one of a cell list, a single cell, and the tracking area. When the information other than the RAN paging area identifier is not designated as the paging area information from the eNB 200, the UE 100 recognizes that the RAN paging area identifier is designated as the paging area information from the eNB 200.

Second Modified Example of the First Embodiment

In the first modified example of the first embodiment, the example in which the RAN paging area identifier is configured in the UE 100 as the paging area information has been described, but a case in which the cell list, the single cell, or the tracking area is configured in the UE 100 may be considered. For example, when the cell list or the tracking area is not designated as the paging area information from the eNB 200, the UE 100 may recognize that the single cell is designated as the paging area information from the eNB 200. In this case, the UE 100 may hold information of the single cell as the paging area information configured in the UE 100 itself.

Second Embodiment

The description will proceed mainly with differences between the second embodiment and the first embodiment.

Figure 9:
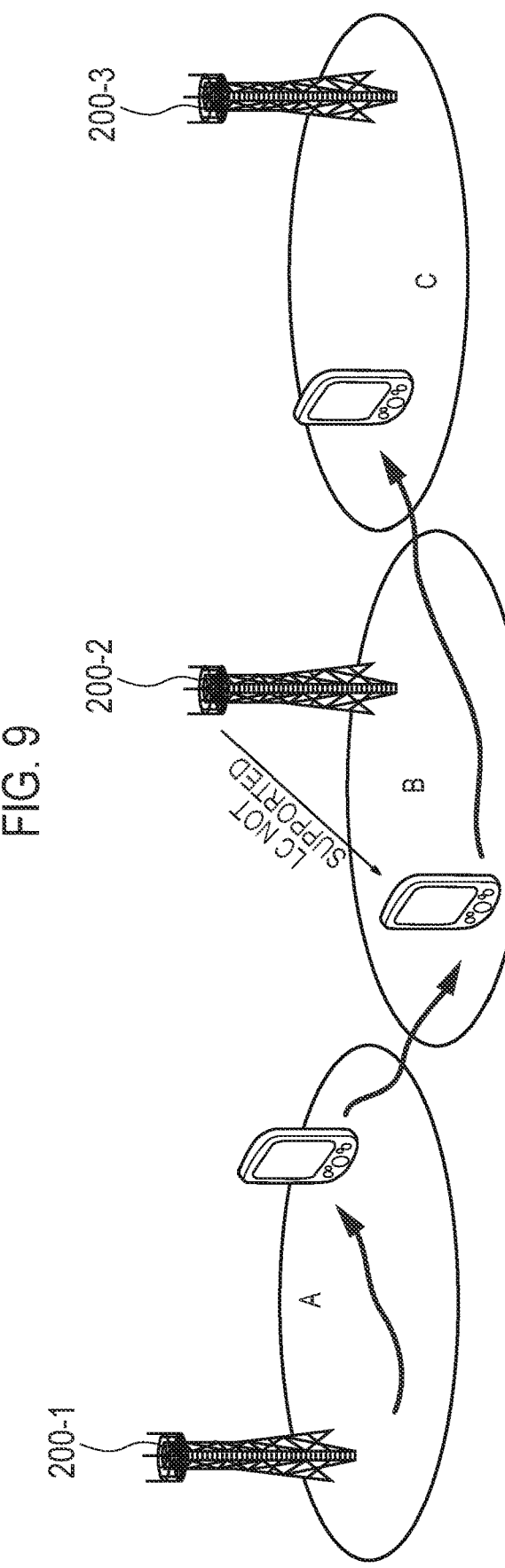
FIG. 9 is a diagram illustrating an assumed scenario according to a second embodiment.

FIG. 9 is a diagram illustrating an assumed scenario according to the second embodiment. The UE 100 in the Light Connection state moves across a plurality of cells. However, there may be cells (the eNB 200) having no function of handling the Light Connection state. Examples of the function of handling the Light Connection state include a RAN paging function, a function of recovering the UE 100 from the Light Connection state, and the like. Hereinafter, a cell that does not have such a function is referred to appropriately as a "cell that does not support Light Connection."

In FIG. 9, among cells A to C managed by eNBs 200-1 to 200-3, the cell B is a cell that does not support the Light Connection. The UE 100 moves in the order of the cells A, B, and C. Each eNB 200 (each cell) may broadcast information indicating whether or not the eNB 200 supports the Light Connection. As an example, the eNB 200 (transmitter 210) transmits the information through the SIB. Such information may be implicit information. For example, the UE 100 (the controller 130) may regard a cell that broadcasts the RAN paging area identifier as the cell supporting the Light Connection. Alternatively, when a selected cell is included in a list of Cell IDs configured in the UE (a list of cells included in the RAN paging area), the selected cell may be regarded as the cell supporting the Light Connection, and when the selected cell is not included, the selected cell may be regarded as the cell not supporting the Light Connection.

In the second embodiment, the UE 100 (the controller 130) determines whether or not the serving cell supports the function of handling the Light Connection state in the Light Connection state in which the RAN paging area is configured. The UE 100 (the controller 130) maintains the Light Connection state in the serving cell even when the serving cell is determined not to support the function. Therefore, the UE 100 in the Light Connection state maintains the Light Connection state even when the UE 100 moves from the cell A to the cell B illustrated in FIG. 9. In other words, even though the UE 100 reselects a cell that does not support the Light Connection, the UE 100 continues the Light Connection operation without interrupting the Light Connection operation.

As a comparative example, a case in which when the UE 100 moves from the cell A to the cell B, the Light Connection operation is stopped, and a normal RRC idle mode operation is performed is considered. However, if a scenario in which the UE 100 subsequently moves from the cell B to the cell C is considered, it is desirable for the UE 100 to continue the Light Connection operation in the cell B.

In the second embodiment, the UE 100 (the controller 130) detects a predetermined event to recover from the Light Connection state. The recovery from the Light Connection state means stopping the Light Connection operation and performing the normal RRC connected mode operation. The predetermined event may be reception of paging by the UE 100 or the occurrence of the necessity to transmit data or signaling by the UE 100.

In a case in which the UE 100 (the controller 130) determines that the serving cell supports the Light Connection, the UE 100 transmits, to the serving cell, a first RRC message for requesting the recovery from the Light Connection state in response to the detection of the predetermined event. The first RRC message may be an RRC recovery (resume) request message or may be an RRC reestablishment request message.

In a case in which the UE 100 (the controller 130) determines that the serving cell does not support the Light Connection, the UE 100 (the controller 130) transmits a second RRC message for requesting establishment of the RRC connection with the serving cell in response to the detection of the predetermined event. The second RRC message may be an RRC connection request message. In other words, in order to recover from the Light Connection state in the cell that does not support the Light Connection, the UE 100 (the controller 130) regards that the UE 100 itself is in the RRC idle mode and transmits the RRC connection request message. Since the RRC connection request message is a message used when the general UE 100 transitions from the RRC idle mode to the RRC connected mode, the message can be handled even in the cell that does not support the Light Connection.

Further, when the UE 100 in the Light Connection State does not monitor traditional paging using the tracking area (that is, MME-initiated paging) in the cell that does not support the Light Connection, the UE 100 is unlikely to be called. In this regard, the UE 100 in the Light Connection state monitors the RAN paging when the currently selected cell supports the Light Connection, and monitors the traditional MME-initiated paging when the currently selected cell does not support the Light Connection. Alternatively, the UE 100 in the Light Connection state may monitor both the RAN paging and the MME-initiated paging under the cell supporting the Light Connection.

In the MME-initiated paging, the UE 100 performs the monitoring at a timing specified by the international mobile subscriber identity (IMSI) serving as UE_ID which is its identifier, for example, "SFN mod T=(T div N)*(UE_ID mod N)." On the other hand, the monitoring timing in the RAN paging may be defined at a timing different from the monitoring timing in the MME-initiated paging (at least a different parameter can be configured).

In the MME-initiated paging, the UE 100 detects an identifier (for example, the IMSI or the S-TMSI) which is configured in advance or allocated by a core network as an identifier (that is, a paging record) related to paging (calling). On the other hand, in the RAN paging, the UE 100 detects an identifier (for example, "Cell ID+C-RNTI," Resume ID, or the like) allocated (or managed) by a RAN node (for example, a base station).

Modified Example of Second Embodiment

A modified example of the second embodiment will be described mainly with differences from the second embodiment.

The UE 100 (the controller 130) according to the modified example of the second embodiment determines whether or not the current serving cell has a function of handling the Light Connection state (that is, whether or not the current serving cell supports the Light Connection) in the Light Connection state in which the paging area information indicating the paging area used in a first paging scheme initiated by the eNB (that is, the RAN paging) is configured in the UE 100. When the current serving cell does not support the Light Connection, the UE 100 (the controller 130) performs at least one of the following first to third processes.

The first process is a process of determining that the procedure for requesting the recovery from the Light Connection state is unable to be performed in the current serving cell. The procedure may be the RRC Resume procedure. The first process may be a process of determining that the recovery request message (the first RRC message described above) is not permitted to be transmitted to the current serving cell. In other words, the UE 100 can transmit the recovery request message to the current serving cell only when the current serving cell supports the Light Connection. The recovery request message may include RAN paging area update information related to RAN paging area update (PAU). The RAN paging area update information may be included in the recovery request message. The RAN paging area update information may be included in a message (for example, an RRC Resume Complete message) transmitted after the transmission of the recovery request message.

The second process is a process of transitioning to the RRC idle mode. In the UE 100, the AS layer may give a notification indicating "RRC Connection failure" to the NAS (upper layer). As a result, the UE 100 transitions to the RRC idle mode. The AS layer may give a notification indicating "RRC Connection failure" to the NAS layer immediately after a cell that does not support the Light Connection is reselected by the cell reselection operation. The AS layer may give a notification indicating "RRC Connection failure" to NAS layer when Mobile Terminated (MT) and/or Mobile Originated (MO) occurs after the cell that does not support the Light Connection is reselected by the cell reselection operation. The MT includes paging reception. The MO includes the occurrence of the necessity of uplink data or signaling. The UE 100 may determine whether or not the current serving cell supports the Light Connection when the MT and/or the MO occur. The UE 100 may check the SIB of the current serving cell when the MT and/or the MO occurs and give a notification indicating "RRC Connection failure" to the NAS layer if a notification indicating Light Connection support is not given.

The third process is a process of monitoring paging using a second paging scheme initiated by the core network (that is, the MME-initiated paging). Such paging may be paging for the RRC idle mode. Specifically, the UE 100 monitors paging in accordance with paging occasions (PF/PO) of DRX for the idle mode. Such a paging occasion will be described in a fifth embodiment. Also, in the third process, the UE 100 receives the paging message, checks the international mobile subscriber identity (IMSI) and/or the SAE temporary mobile subscriber identity (S-TMSI) in the received paging message, and determines whether or not the paging message is addressed to the UE 100 itself. In the third process, the UE 100 may not check the identifier (for example, the Resume ID) for the RAN paging for the received paging message. In the third process, the UE 100 may maintain the Light Connection state (that is, not transition to the RRC idle mode and not return to the normal RRC connected mode). The UE 100 may leave the Light Connection state and return to the normal RRC connected mode when the MT or the MO occurs. Alternatively, when the MT or the MO occurs, the UE 100 may transition to the RRC idle mode, for example, by giving the notification indicating "RRC Connection Failure" from the AS layer to the NAS layer.

The UE 100 may determine that the message used for the Light Connection state is unable to be transmitted to the current serving cell as the current serving cell does not support the Light Connection. Such a message may be, for example, a notification message indicating that no data communication occurs (or is unlikely to occur) in the UE 100.

Third Embodiment

A third embodiment will be described mainly with differences from the first and second embodiments. The third embodiment is an embodiment related to the cell reselection operation of the UE 100 in the Light Connection state.

The UE 100 according to the third embodiment includes a controller 130 that performs the cell reselection operation in the Light Connection state. The controller 130 preferentially selects, as the serving cell of the UE 100, the cell that supports the recovery from the Light Connection state in the cell reselection operation.

A general cell reselection operation is an operation of selecting an appropriate cell in accordance with ranking based on a priority of a frequency to which the cell belongs and a radio quality of the cell.

In the cell reselection operation according to the third embodiment, the UE 100 (the controller 130) may configure the cell supporting the Light Connected as the highest priority. The UE 100 (the controller 130) may configure the cell that does not support the Light Connected as the lowest priority. Here, Highest/Lowest means priorities (for example, "8" and "−1") higher/lower than a priority (Cell-ReselectionPriority: 0 to 7) broadcast from the eNB 200 or a value obtained by adding the priority and the sub priority (CellReselectionSubPriority: 0.2, 0.4, 0.6, and 0.8).

In the cell reselection operation according to the third embodiment, the UE 100 (the controller 130) may give a priority to the cell supporting the Light Connected by introducing an offset into the ranking. For example, a positive offset is added to the cell supporting the Light Connected, and/or a negative offset is added to the cell that does not support the Light Connected. The offset value may be a value which is defined in advance or may be a value which is configured from the eNB 200. When the offset value is configured from the eNB 200, the eNB 200 may broadcast the offset value. When the offset value is configured from the eNB 200, the eNB 200 may configure the offset value through dedicated signaling for each UE.

In the third embodiment, the eNB 200 may configure, in the UE 100, whether or not priority control of the cell supporting the recovery from the Light Connection state is performed. The configuration may be performed when transition to the Light Connection state is performed. The configuration may be included in the RRC Connection Reconfiguration or the RRC Connection Release.

Each eNB 200 (each cell) may broadcast information indicating whether or not the Light Connection state (specifically, the recovery from the Light Connection state) is supported. As an example, the eNB 200 transmits the information through the SIB. Such information may be implicit information. For example, the UE 100 may regard the cell that transmits the identifier of the RAN paging area as the cell supporting the Light Connection state.

In the third embodiment, the UE 100 may support the recovery from the Light Connection state and transition to the RRC idle mode as the cell that does not satisfy a predetermined radio quality standard (for example, S criterion) is not detected. As an example, the UE 100 may transition to the RRC idle mode, for example, when the cell satisfying the S criterion is only a legacy cell (that is, a cell not supporting the Light Connection state).

Modified Example of Third Embodiment

A modified example of the third embodiment will be described mainly with differences from the third embodiment.

The UE 100 (the controller 130) according to the modified example of the third embodiment determines whether or not an adjacent cell which is a movement destination of the UE 100 has a function of handling the Light Connection state (whether or not the adjacent cell supports the Light Connection) in the Light Connection state in which the paging area information indicating the paging area used in the first paging scheme initiated by the eNB (the RAN paging) is configured in the UE 100. The UE 100 (transmitter 120) transmits the recovery request message to the current serving cell before the cell reselection of changing the serving cell of the UE 100 from the current serving cell to the adjacent cell as the adjacent cell does not support the Light Connection. The recovery request message is a message (RRC Connection Resume message) for requesting the recovery from the Light Connection state.

In the modified example of the third embodiment, the UE 100 (the receiver 110) may receive information indicating whether or not the adjacent cell supports the Light Connection from the current serving cell. The UE 100 (the controller 130) may determine whether or not the adjacent cell supports the Light Connection on the basis of the information received from the current serving cell.

Figure 10:
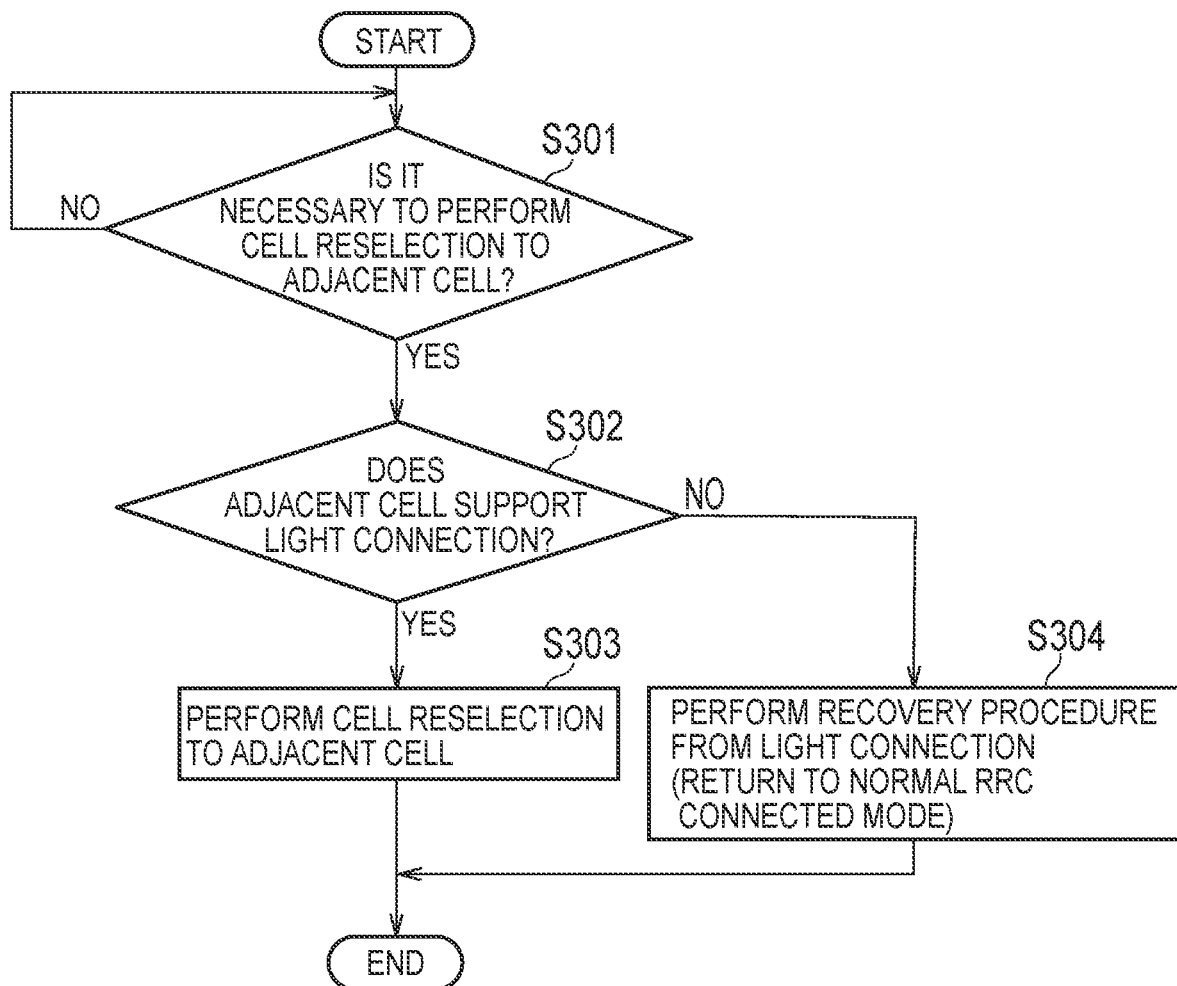
FIG. 10 is a diagram illustrating an operation example according to a modified example of a third embodiment.

FIG. 10 is a diagram illustrating an operation example according to the modified example of the third embodiment.

In step S301, the UE 100 in the Light Connection state determines whether or not it is necessary to perform the cell reselection to the adjacent cell on the basis of the determination result or the like for the adjacent cell. The determination is performed at a predetermined timing before the cell reselection is actually performed. The predetermined timing may be a timing immediately before the cell reselection or may be a timing with a certain grace period. The determination result may be a determination result of a reception level (reference signal received power (RSRP)). The determination result may be a determination result of reference signal received power (RSRQ) and/or a reference signal-signal to noise and interference ratio (RS-SINR). The UE 100 may recognize that it is immediately before the cell reselection in accordance with a threshold value (for example, an RSRP threshold value, an RSRQ threshold value, and/or an RS-SINR threshold value) configured from the eNB 200. The threshold value may be configured through unicast signaling (for example, the RRC Connection Release message) indicating the Light Connection or may be broadcast through the SIB.

When the UE 100 determines that it is necessary to perform the cell reselection to the adjacent cells (step S301: YES), in step S302, the UE 100 determines whether or not the adjacent cell supports the Light Connection. The UE 100 receives, from the current serving cell, a list indicating whether or not the adjacent cell supports the Light Connection. The UE 100 may perform the determination on the basis of the list. The list may be a list of identifiers of adjacent cells that support the Light Connection. The list may be a list of identifiers of adjacent cells that do not support the Light Connection. Alternatively, the UE 100 may perform the determination on the basis of the information (for example, the SIB) broadcast from the adjacent cell. The information broadcast from the adjacent cell may be information indicating whether or not the Light Connection is supported. The process of S302 may be performed before S301.

When the UE 100 determines that the adjacent cell supports the Light Connection (step S302: YES), in step S303, the UE 100 performs the cell reselection to the adjacent cell.

When the UE 100 determines that the adjacent cell does not support the Light Connection (step S302: NO), in step S304, the UE 100 transmits the recovery request message to the current serving cell in order to transition to the normal RRC connected mode.

The recovery request message may include an identifier (for example, the Resume ID) which is allocated from the eNB 200 to the UE 100 when the UE 100 transitions to the Light Connection state. The identifier may be configured in the UE 100 through unicast signaling (for example, the RRC Connection Release message) indicating the Light Connection.

The recovery request message may also include information indicating that the adjacent cell does not support the Light Connection. The information may be included in the recovery request message as "Resume Cause" indicating the reason for the recovery request.

The recovery request message may include identification information for identifying an adjacent cell. The identification information is Physical Cell Identity (PCI), E-UTRAN Cell Global Identifier (ECGI), and/or the like. The recovery request message may include the determination result for the adjacent cell. The determination result may be the RSRP. The determination result may be a reference signal received quality (RSRQ). The identification information and/or the determination result of the adjacent cell may be included in the recovery request message only when an instruction is given from the eNB 200 (for example, the current serving cell) through unicast signaling or the SIB. The UE 100 may not include the identification information and/or the determination result of the adjacent cell in the recovery request message when there is no instruction from the eNB 200. For example, when the eNB 200 is scheduled to trigger a measurement report of the UE 100 immediately after the UE 100 returns to the normal RRC connected mode, the eNB 200 does not give the instruction.

As a result of step S304, the UE 100 transitions to the normal RRC connected mode. Thereafter, the current serving cell (the eNB 200) may cause the UE 100 to transition to the RRC idle mode by transmitting the RRC Connection Release message to the UE 100. The eNB 200 may transmit an RRC connection reject message to the UE 100 and cause the UE 100 to transition from the Light Connection state to the RRC idle mode without causing the UE 100 to transition to the normal RRC connected mode. After causing the UE 100 to transition to the RRC connected mode, the eNB 200 may hand the UE 100 over to the adjacent cell on the basis of the identification information and/or the determination result of the adjacent cell included in the recovery request message. The eNB 200 may consider a past data communication history or the like of the UE 100 in determining whether or not the handover of the UE 100 is performed. The eNB 200 may delete context information (UE context) of the UE 100 that has transmitted the recovery request message or may transfer it to the adjacent cell (the adjacent eNB).

Fourth Embodiment

A fourth embodiment will be described mainly with differences from the first to third embodiments. The fourth embodiment is an embodiment related to an operation of performing the RAN paging through the eNB 200.

The eNB 200 according to the fourth embodiment includes a controller 230 that performs the RAN paging on the UE 100 in the Light Connection state and determines whether or not the RAN paging is successfully performed and a transmitter (a backhaul communication unit 240) that transmits a failure notification indicating a failure of the RAN paging to the MME 300C in accordance with the failure of the RAN paging. The RAN paging is an operation in which the RAN performs the paging of the UE 100 in units of RAN paging areas. The failure notification may be a message for causing the MME 300C to execute the paging based on the tracking area in which the UE 100 exists. Therefore, even when the RAN paging fails, the MME 300C can execute the normal paging.

The eNB 200 according to the fourth embodiment may include a receiver (a backhaul communication unit 240) that receives, from another the eNB 200, information indicating whether or not another eNB 200 in the RAN paging has performed paging successfully. The controller 230 determines that the RAN paging has failed as both its own the eNB 200 and another the eNB 200 have failed in paging.

Figure 11:
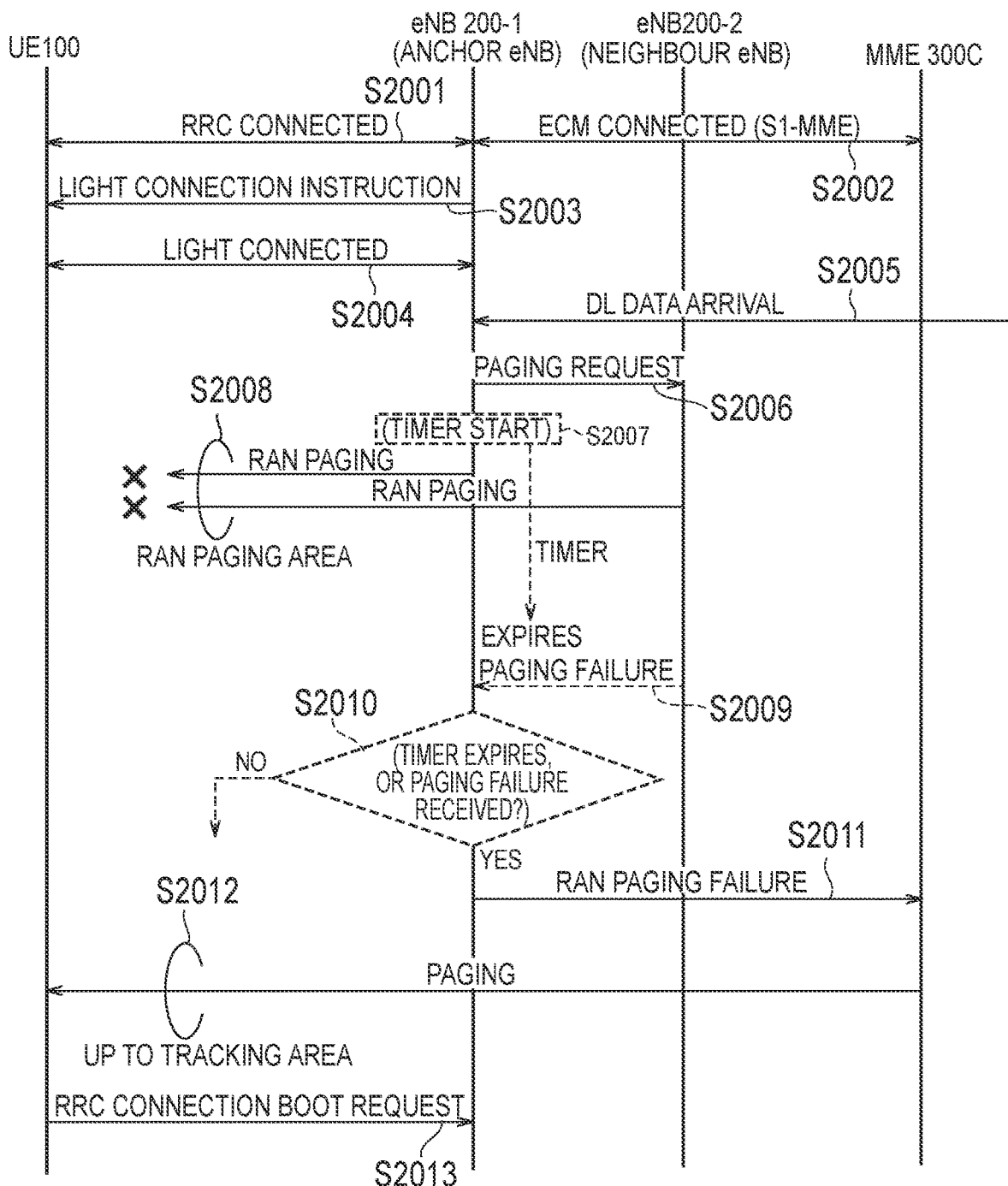
FIG. 11 is a diagram illustrating an operation example according to a fourth embodiment.

FIG. 11 is a diagram illustrating an operation example according to the fourth embodiment. In FIG. 11, an anchor eNB 200-1 and an eNB 200-2 belong to the same RAN paging area. The anchor eNB 200-1 and the eNB 200-2 may be connected via the X2 interface. In the initial state, the UE 100 is in the RRC connected mode (S2001 and S2002). In FIG. 11, an operation indicated by a broken line is not essential.

The operations of steps S2003 and S2004 are similar to those in the first embodiment.

In step S2005, the anchor eNB 200-1 receives data (DL data) addressed to the UE 100 from an S-GW 300U via an S1 connection for the UE 100. The anchor eNB 200-1 determines to start the paging of the UE 100 in response with the reception of the data.

In step S2006, the anchor eNB 200-1 transmits, to the eNB 200-2, a paging request for requesting execution of the paging (RAN paging) of the UE 100. The paging request may include information specifying a paging timing (see the fifth embodiment).

In step S2007, the anchor eNB 200-1 causes a timer to start when the paging is determined to start or when the paging request is transmitted. The anchor eNB 200-1 may cause the timer to be stopped upon receiving a paging response from the UE 100 or upon receiving a paging success notification from the eNB 200-2.

In step S2008, the anchor eNB 200-1 and the eNB 200-2 transmit a paging message (Ran paging) addressed to the UE 100 in the RAN paging area configured in the UE 100. Here, the description will proceed assuming that the UE 100 has failed to receive the paging message (Ran paging).

In step S2009, the eNB 200-2 transmits, to the anchor eNB 200-1, a failure notification (Paging Failure) indicating that the UE 100 has failed in paging (RAN paging).

In step S2010, the anchor eNB 200-1 determines whether or not the timer has expired and/or whether or not the failure notification (Paging Failure) has been received. Here, the description will proceed assuming that the timer has expired and/or the failure notification (Paging Failure) has been received.

In step S2011, the anchor eNB 200-1 transmits the failure notification (RAN Paging Failure) indicating the failure of the RAN paging to the MME 300C on the S1 interface. The failure notification (RAN Paging Failure) includes an identifier (for example, an eNB UE S1AP ID) used for the MME 300C to identify the UE 100. The failure notification (RAN Paging Failure) may include an MME UE S1AP ID, a Cause (for example, RAN Paging Failed), or the like. Instead of the failure notification (RAN Paging Failure), the paging request for requesting execution of paging may be used.

In step S2012, in response to the reception of the failure notification (RAN Paging Failure) from the anchor eNB 200-1, the MME 300C transmits the paging message (PAGING) to each eNB 200 belonging to the tracking area in which the UE 100 exists. Each eNB 200 belonging to the tracking area in which the UE 100 exists transmits the paging message in its own cell. The MME 300C may transmit the paging message only to some eNBs 200 belonging to the tracking area instead of transmitting the paging message to all the eNBs 200 belonging to the tracking area in which the UE 100 exists.

In step S2013, in response to reception of the paging message (PAGING), the UE 100 transmits the message (RRC Connection Boot request) for requesting the recovery from the Light Connection state to the eNB 200 (for example, the anchor eNB 200-1).

First Modified Example of Fourth Embodiment

A first modified example of the fourth embodiment will be described mainly with differences from the fourth embodiment.

Figure 12:
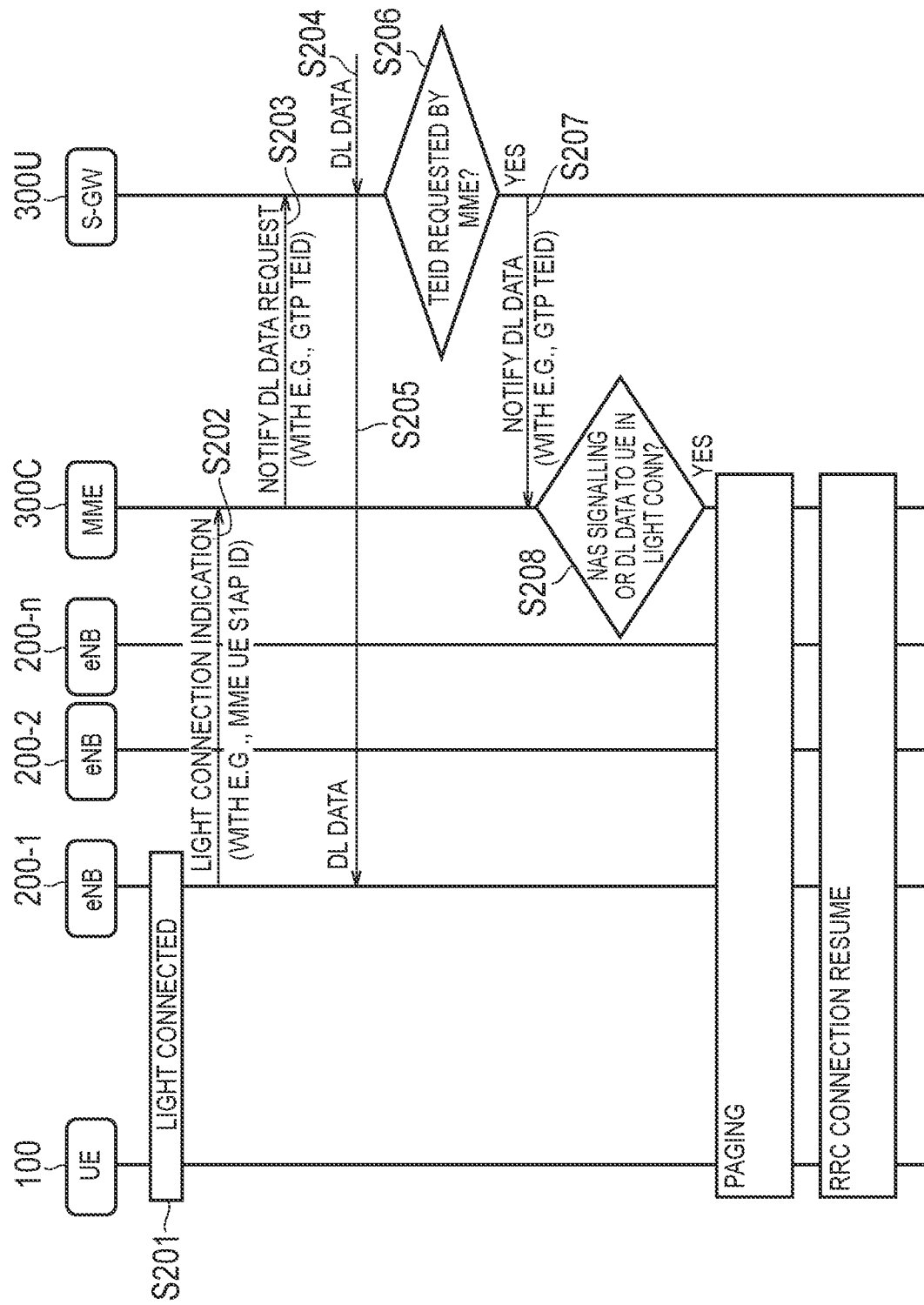
FIG. 12 is a diagram illustrating an operation example according to a first modified example of the fourth embodiment.

FIG. 12 is a diagram illustrating an operation example according to the first modified example of the fourth embodiment. The eNBs 200-1 to 200-n illustrated in FIG. 12 are eNBs 200 belonging to the same tracking area.

As illustrated in FIG. 12, in step S201, the eNB 200-1 causes the UE 100 to transition to the Light Connection state.

In step S202, the eNB 200-1 transmits, to the MME 300C, a transition notification (Light Connection Indication) related to the UE 100 to transition to the Light Connection state. The transition notification includes an identifier (for example, an MME UE S1AP ID) for identifying the UE 100 (a specific UE 100) to transition to the Light Connection state.

In step S203, in response to the reception of the transition notification, the MME 300C transmits a monitoring request (Notify DL data Request) to the S-GW 300U. The monitoring request is a message for requesting to monitor whether or not there is DL data addressed to a specific UE 100. The message includes an identifier (for example, GTP TEID) for identifying the specific UE 100. The S-GW 300U starts monitoring DL data addressed to the specific UE 100 in response to the reception of the monitoring request. When the monitoring is started, the S-GW 300U may transmit an acknowledgment (ACK) to the monitoring request to the MME 300C.

In step S204, the S-GW 300U receives the DL data addressed to the specific UE 100 from the P-GW. The S-GW 300U may transfer the DL data addressed to the specific UE 100 to the eNB 200-1 using the S1-U connection (step S205). Alternatively, the S-GW 300U may temporarily stop the transfer of the DL data addressed to the specific UE 100. The MME 300C may transmit a monitoring request for requesting such a stop to the S-GW 300U using the same message as the monitoring request or a message different from the monitoring request.

When the DL data addressed to the specific UE 100 is received (step S206: YES), in step S207, the S-GW 300U transmits a notification (Notify DL data) indicating that there is DL data addressed to the specific UE 100 to the MME 300C.

In step S208, the MME 300C determines whether or not it is necessary to transmit DL data or NAS signaling addressed to a specific UE 100. The MME 300C determines, on the basis of the notification from the S-GW 300U, whether or not it is necessary to transmit the DL data addressed to the specific UE 100.

If "YES" is determined in step S208, the MME 300C determines a registered tracking area of the specific UE 100 on the basis of the UE identifier included in the transition notification, and transmits an S1 paging message to the eNB 200 belonging to the registered tracking area. Thereafter, the paging procedure and the RRC connection resume procedure are performed.

Second Modified Example of Fourth Embodiment

A second modified example of the fourth embodiment will be described mainly with difference from the fourth embodiment and the first modified example thereof.

In the fourth embodiment, the example of performing the paging (MME paging) using the second paging scheme initiated by the core network (MME) in response to the failure of the paging (RAN paging) using the first paging scheme initiated by the eNB has been described. The modified example of the fourth embodiment is a modified example in which the MME paging is performed in parallel with the RAN paging.

The eNB 200 (controller 230) according to the second modified example of the fourth embodiment performs the first paging (the RAN paging) for the UE 100 using the first paging scheme initiated by the eNB. The eNB 200 according to the modified example of the fourth embodiment may be an anchor eNB. When the eNB 200 (controller 230) determines that the RAN paging is unlikely to reach the UE 100, the eNB 200 (controller 230) give a notification indicating predetermined information causing the UE 100 to start the MME paging to the core network (MME). The UE 100 (controller 230) gives a notification indicating predetermined information to the core network (MME) at a timing before the RAN paging is executed or while the RAN paging is being. The predetermined information may be an MME paging execution request. The predetermined information may be a notification similar to the first modified example of the fourth embodiment.

In the second modified example of the fourth embodiment, the eNB 200 (controller 230) may determine that the RAN paging is unlikely to reach the UE 100 when there is an area which is not covered by the paging area (that is, the RAN paging area) used in the RAN paging within a predetermined geographical area. The predetermined geographical area may be an area of a geographical range corresponding to the RAN paging area. The predetermined geographical area may be a tracking area. When there is a cell that does not support the RAN paging among the cells included in the predetermined geographical area, the geographical range of the cell is not covered by the RAN paging area. In other words, a coverage hole of the RAN paging occurs within the predetermined geographical area. In such a case, the eNB 200 (controller 230) determines that the RAN paging is unlikely to reach the UE 100, and performs control such that the MME paging is performed in parallel with the RAN paging.

When the Light Connection is configured in the UE 100, the eNB 200 may give a notification indicating that configuration to the MME 300C. When the eNB 200 determines that the UE 100 supports the Light Connection before the Light Connection is configured in the UE 100, the eNB 200 may give a notification indicating that the UE 100 supports the Light Connection to the MME 300C. The eNB 200 may give a notification to the MME 300C on the basis of the configuration from the OAM.

After the notification is received, the MME 300C may transmit the S1 paging message in response to the notification from the S-GW 300U (see step S207 in FIG. 12). The MME 300C may transmit the S1 paging message periodically.

When the DL data arrives (see step S204 in FIG. 12), the S-GW 300U may transfer the DL data to the anchor eNB for the RAN paging and hold (the copy of) the DL data for the MME paging.

The eNB 200 that has received the S1 paging message from the MME 300C may merge the received S1 paging message (the MME paging message) and the RAN paging message to generate a paging message (the RRC message) to be transmitted to the UE 100. For example, the paging message (the RRC message) including both the IMSI in the S1 paging message and the Resume ID in the RAN paging message may be generated.

The UE 100 receives only the MME paging message, receives only the RAN paging message, or receives both messages. Alternatively, the UE 100 may receive a paging message in which the MME paging message and the RAN paging message are merged. The UE 100 may check the UE identification information (for example, the TMGI, the S-TMSI, or the Resume ID) in the received paging message and determine a type of paging message in accordance with the type of UE identification information.

For example, if the received paging message includes the Resume ID (and the S-TMSI) allocated to the UE 100 itself, the UE 100 may determine that the RAN paging message has been received. The UE 100 may determine that the MME paging message has been received if the received paging message does not include the Resume ID (and the S-TMSI) allocated to the UE 100 itself. The UE 100 may start the RRC Connection Resume procedure in response to the reception of the paging message.

The UE 100 may transmit a response corresponding to the type of received paging message to the network. For example, when the UE 100 determines that the MME paging message has been received, the UE 100 may transmit a paging response (NAS signaling) to the MME 300C. When the UE 100 determines that the RAN paging message has been received, the UE 100 may transmit the RRC Connection Resume message to the eNB 200. The UE 100 may include information (Cause=MT access) indicating that the paging has been received in the RRC Connection Resume message. The UE 100 may include the Resume ID allocated to the UE 100 itself in the RRC Connection Resume message.

When UE 100 determines that the paging messages of both the RAN paging and the MME paging (or the merged paging messages) have been received, the UE 100 may give a priority to the response to the MME paging or may give a priority to the response to the RAN paging. When UE 100 determines that the paging messages of both the RAN paging and the MME paging (or the merged paging messages) have been received, the UE 100 may transmit two responses corresponding to both of the paging messages.

When the paging response is received from the UE 100, the MME 300C may give a notification indicating that the response has been received to the anchor eNB. When the eNB 200 receives the response to the RAN paging from the UE 100, the eNB 200 may give a notification indicating that the response has been received to the MME 300C.

Third Modified Example of Fourth Embodiment

The MME 300C may give a notification to the anchor eNB when a tracking area update message (NAS signaling) is received from the UE 100. The MME 300C may transmit the notification only when the RAN paging area is configured similarly to the tracking area. The MME 300C may transmit the notification only when the notification indicating that the UE 100 is configured to the Light Connection is received from the eNB 200. The MME 300C may include the identifier of the eNB to which the UE 100 is currently connected in the notification. The anchor eNB may transfer the UE context to the eNB to which the UE 100 is currently connected on the basis of the notification. Alternatively, the notification may be a UE Context Release. The eNB 200 that has received the UE Context Release releases the UE context.

Fifth Embodiment

A fifth embodiment will be described mainly with differences from the first to fourth embodiments. The fifth embodiment is an embodiment regarding the DRX operation of the UE 100 in the Light Connection state.

A general idle mode DRX operation will be described. In order to reduce power consumption, discontinuous reception (DRX) may be configured in the UE 100. In the DRX operation, the UE 100 in the RRC idle mode monitors the paging message in a paging reception opportunity (paging occasion) that occurs at a predetermined time interval (DRX cycle). In the DRX operation, UE 100 intermittently monitors the PDCCH to receive paging. The UE 100 decodes the PDCCH using an identifier for paging (paging radio network temporary identifier (P-RNTI)), and acquires allocation information of a paging channel. The UE 100 acquires the paging message on the basis of the allocation information. A PDCCH monitor timing in the UE 100 is decided on the basis of the identifier (international mobile subscriber identity (IMSI)) of the UE 100. The PDCCH monitor timing (PDCCH monitor sub frame) in the DRX operation is referred to as a paging occasion (PO). The PO corresponds to a paging reception opportunity.

The UE 100 and the eNB 200 calculate the paging occasions (PO) and a paging frame (PF) which is a radio frame that may include the paging occasion as follows.

A system frame number (SFN) of the PF can be obtained from the following Formula (1).

$$\text{SFN mod } T = (T \text{ div } N)*(\text{UE\_ID mod } N) \tag{1}$$

T is the DRX cycle of the UE 100 for monitoring paging. T is indicated by the number of radio frames. Also, T is a smaller one out of a default DRX value broadcast from the eNB 200 through the system information block (SIB) and a UE-specific DRX value configured in the UE 100 through the NAS message. When the UE-specific DRX value is not configured, UE 100 applies the default DRX value. N is a minimum value out of T and nB. nB is a value selected from 4T, 2T, T, T/2, T/4, T/8, T/16, and T/32. UE_ID is a value obtained by "IMSI mod 1024."

Among the PFs obtained as described above, an index i_s is obtained by the following Formula (2), and a sub frame number of the PO corresponding to the index i_s is obtained.

$$i\_s = \text{floor}(\text{UE\_ID}/N) \text{ mod } Ns \tag{2}$$

Here, Ns is a maximum value out of 1 and nB/T.

Figure 13:
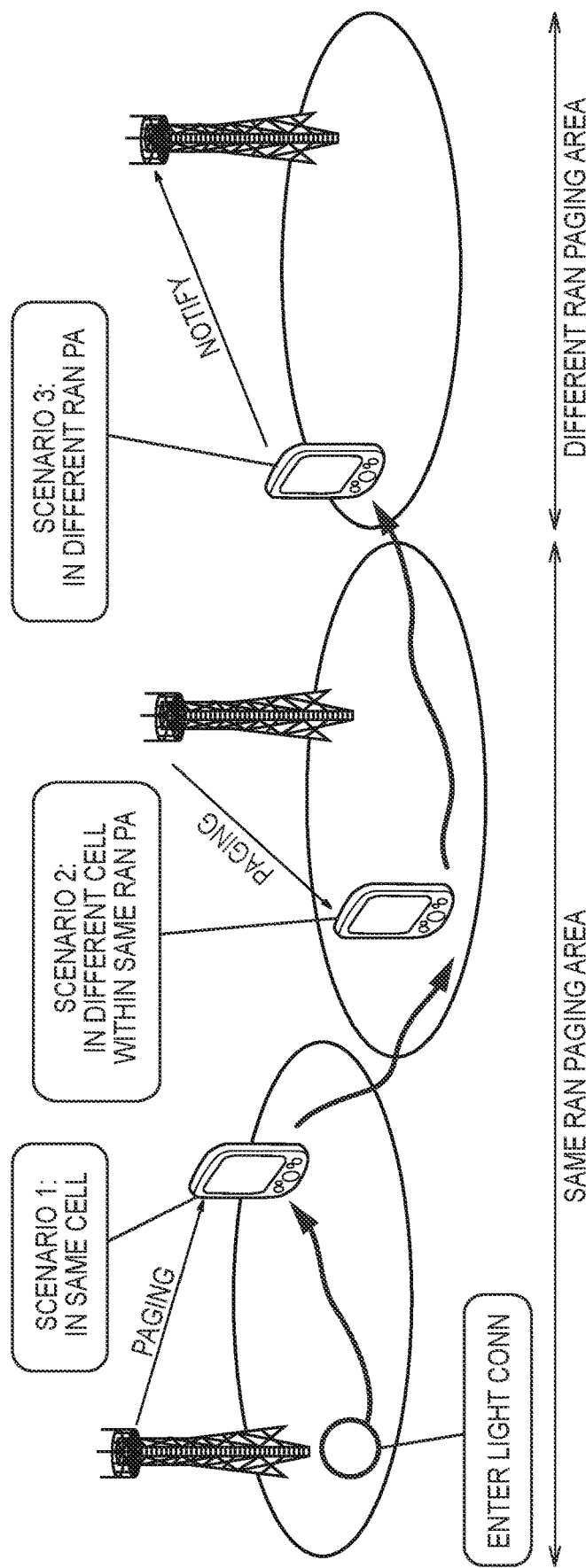
FIGS. 13A to 13C are diagrams illustrating an operation example according to a fifth embodiment.

An operation according to the fifth embodiment will be described. FIG. 13 is a diagram illustrating an operation example according to the fifth embodiment.

The UE 100 according to the operation pattern 1 of the fifth embodiment includes a receiver 110 that a transition instruction for instructing transition to the Light Connection state from the serving cell and a controller 130 that transitions to the Light Connection state in the serving cell, and performs the DRX operation of the RRC connected mode. As illustrated in FIG. 13(a), the UE 100 continues the DRX operation of the RRC connected mode while the UE 100 exists in the serving cell at the time of transition to the Light Connection state. As illustrated in FIG. 13(b), the controller 130 of the UE 100 stops the DRX operation of the RRC connected mode as the UE 100 moves from the serving cell to another cell in the RAN paging area. The controller 130 of the UE 100 stops the DRX operation of the RRC connected mode and starts an operation based on the DRX operation of the RRC idle mode. The operation based on the DRX operation of the RRC idle mode is an operation of deciding the PF and the PO by the formula of the paging frame (PF) and the paging occasion (PO) in the DRX operation of the RRC idle mode or a formula using it. As illustrated in FIG. 13(c), the controller 130 of the UE 100 gives a notification when the UE 100 moves to a different RAN paging area.

Even when the UE 100 according to the operation pattern 2 of the fifth embodiment moves from the serving cell to another cell at the time of transition to the Light Connection state, if the other cell belongs to the same the RAN paging area, the UE 100 continues the DRX operation of the RRC connected mode. In this case, as illustrated in FIGS. 13(a) and (b), the UE 100 can continue the DRX operation of the RRC connected mode in the same RAN paging area. That is, even when the UE 100 moves to another cell, the UE 100 performs the reception operation in accordance with the connected mode DRX.

Here, such an operation may be performed in units of eNBs 200. That is, in the operation patterns 1 and 2 of the fifth embodiment, the "serving cell" may be read as a "serving eNB" or an "anchor eNB," and "another cell" may be read as an "another eNB."

In the operation patterns 1 and 2 of the fifth embodiment, the UE 100 other than the anchor eNB need not necessarily hold the context information of the UE 100. Therefore, it is desirable for other eNBs in the same the RAN paging area to acquire information for deciding the paging timing from the anchor eNB. The other eNBs perform the RAN paging for the UE 100 in the Light Connection state. The other eNBs acquire information for deciding a timing of transmitting the paging message for the RAN paging to the UE 100 from the anchor eNB. The information for deciding the timing includes at least one of identification information of the UE 100 (for example, the IMSI, the S-TMSI, the Resume ID, or the like) and the DRX configuration of the RRC connected mode. The anchor eNB may include such information in the paging request and transmit it to other eNBs.

The identification information for deciding the paging timing may be an E-UTRAN cell global identifier (ECGI) and a cell-radio network temporary identifier (C-RNTI). The anchor eNB 200-1 may allocate the identification information to the UE 100 when causing the UE 100 to transition to the Light Connection state.

First Modified Example of Fifth Embodiment

In a case in which the timing at which the RAN paging is transmitted is specified by the IMSI, a notification indicating the IMSI may be given from the UE 100 since the eNB 200 does not know the IMSI of the UE 100 for performing the RAN paging. The UE 100 may notify the base station of its IMSI as capability information indicating that the UE 100 supports the Light Connection function. When the eNB 200 is notified of the IMSI in the capability information of the UE 100, the eNB 200 may determine that the UE 100 supports the Light Connection function and use the IMSI for specifying the RAN paging timing.

Second Modified Example of Fifth Embodiment

A second modified example of the fifth embodiment will be described mainly with difference from the fifth embodiment and the first modified example thereof.

The eNB 200 (controller 230) according to the second modified example of the fifth embodiment performs paging (the RAN paging) for the UE 100 using an eNB-initiated paging scheme. In the eNB-initiated paging scheme, the eNB 200 (the controller 230) determines a paging occasion (PF/PO) indicating a candidate timing for transmitting the paging message to the UE 100 using the identification information for identifying the UE 100. The eNB 200 (the controller 230) acquires the identification information from the UE 100 or the core network (for example, the MME 300C). The eNB 200 (the anchor eNB) may store the identification information, the IMSI, the Resume ID, the C-RNTI, and the UE Context in association with one another.

The eNB 200 (the anchor eNB) may give a notification indicating the identification information to the other eNBs 200 in the paging area (the RAN paging area) used in the eNB-initiated paging scheme. The eNB 200 may give a notification indicating the identification information through an X2 Paging message (see step S2006 in FIG. 11).

The identification information used for deciding the paging occasion (PF/PO) may be the IMSI or may be other identification information (for example, "UE Identity Index Value" in the S1 paging message). The identification information may be a UE ID calculated from the IMSI using a predetermined calculation formula (for example, IMSI mod 1024).

Case of Acquiring Identification Information from MME 300C

The MME 300C may notify the eNB 200 of the identification information through a UE CONTEXT MODIFICATION REQUEST message which is a sort of S1 message. The UE CONTEXT MODIFICATION REQUEST message is a message for changing a part of the already established UE context (that is, the UE context existing in the eNB 200). The MME 300C may notify the eNB 200 of the identification information through other S1 messages (for example, INITIAL CONTEXT SETUP REQUEST and UE RADIO CAPABILITY MATCH RESPONSE). The INITIAL CONTEXT SETUP REQUEST message is a message for requesting to establish the UE context (that is, to generate the UE context in the eNB 200). The UE RADIO CAPABILITY MATCH REQUEST message is a request message notified from the MME 300C to the eNB 200 in order to check whether or not radio capability (capability) information of the UE 100 matches between the MME 300C and the eNB 200.

The MME 300C may notify the eNB 200 of the identification information only when the UE 100 supports the Light Connection.

The MME 300C may notify the eNB 200 of the identification information only when the identification information is inquired from the eNB 200 (a new message). For example, the eNB 200 made an inquiry to the MME 300C when the RAN paging is necessary and/or when the UE 100 transitions to the Light Connection.

Case of Acquiring Identification Information from UE 100

The UE 100 may notify the eNB 200 of the identification information through an RRC Connection Release Complete message which is a response message to the RRC Connection Release message from the eNB 200. The UE 100 may include the identification information in the RRC Connection Release Complete message only when the transition to the Light Connection is instructed in the RRC Connection Release message.

The UE 100 may use a procedure other than the RRC Connection Release Procedure. For example, the UE 100 may use the UE Information procedure which is a sort of RRC procedure. The UE 100 may include the identification information in a response (UE Information message) to an inquiry from the eNB 200. The UE 100 may use the UE Capability Transfer procedure which is a sort of RRC procedure. The UE 100 may transmit, to the eNB 200, a UE Capability message including the identification information only when the UE 100 supports the Light Connection. The UE 100 may use a UE Assistance Information procedure which is a sort of RRC procedure. The UE 100 may include the identification information in a message used for the Light Connection state. Such a message may be, for example, a notification message indicating that no data communication has occurred (or is unlikely to occur) in the UE 100.

Case of Decrypting NAS Message

The eNB 200 decrypts the NAS message (for example, ATTACH REQUEST or ATTACH ACCEPT) which is transmitted and received between the UE 100 and the MME 300C and reads the IMSI in the NAS message. The eNB 200 may convert the PF/PO into numerical information which can be calculated and then store it without storing the read IMSI without change.

OTHER EMBODIMENTS

In the above-described embodiment, the Public Land Mobile Network (PLMN) has not been described. The eNB 200 may configure one or more PLMN identifiers (for example, a list of PLMN identifiers) together with the RAN paging area identifier or the cell identifier as the RAN paging area configured in the UE 100. The UE 100 may recognize a cell which broadcasts the RAN paging area identifier or the cell identifier configured in the UE 100 and broadcasts the PLMN identifier configured in itself as a cell in the RAN paging area.

The present disclosure is not limited to the case in which each embodiment described above is implemented independently, but two or more embodiments may be implemented in combination. For example, some operations according to one embodiment may be added to another embodiment. Alternatively, some operations according to one embodiment may be replaced with some operations of another embodiment.

In the embodiments described above, the LTE system has been described as a mobile communication system. However, the embodiments are not limited to the LTE system. The embodiments may be applied to a system other than the LTE system. For example, the embodiments may be applied to the 5th generation communication system (5G system). In the 5G system, an Inactive state (Inactive mode) is considered as a new RRC state, and the Light Connection state in the embodiments may be read as the Inactive state. Also, an entity that performs core network paging in the 5G system may be an entity other than the MME. When the embodiments are applied to the 5G system, the RAN paging may be read as a RAN notification, and the RAN paging area may be read as a RAN notification area.

(Additional Note)

(1. Introduction)

In this additional note, the issues related to/out of the email discussion scope are discussed.

(2. Discussion)

(2.1. S-TMSI Reception in RAN-Initiated Paging Message)

Discussion point 1, it was agreed a working assumption that the "Resume ID will be used in the RAN initiated paging message. UE needs to check both the S-TMSI and Resume ID in the paging message. FFS: UE actions on reception of its S-TMSI". Please provide your view".

As stated in the current specification, the paging message is used for the UE to be informed of the paging information, SI change notification, ETWS/CMAS notifications, EAB parameter modifications and E-UTRAN inter-frequency redistribution triggering. The Uu paging messages for paging information and ETWS/CMAS notifications are normally triggered by S1 PAGING and S1 WRITE-REPLACE WARNING REQUEST respectively, while one for the other purposes is initiated by the eNB.

From the eNB's perspective, S-TMSI is only provided within RRC Connection Request, RRC Connection Setup Complete or S1 PAGING As informed by SA3, S-TSMI is frequently updated for security reason. So, the eNB may not have the knowledge of current S-TSMI for a specific UE.

Therefore, if the RAN-initiated paging message to the UE in Light Connection contains S-TMSI, the paging message is actually triggered by the MME, i.e., S1 PAGING. It could be considered as some sort of abnormal condition, e.g., RAN-initiated paging is unreachable for some reason and the (anchor) eNB asks the MME to initiate the legacy CN-controlled paging.

So, before to discuss on "FFS: UE actions on reception of its S-TMSI", it needs to be clarified whether and what the case that the UE receives its S-TMSI within RAN-initiated paging message is.

Proposal 1: RAN2 should clarify whether and what the case that the UE receives its S-TMSI within RAN-initiated paging message is, if "FFS: UE actions on reception of its S-TMSI" needs to be identified.

Figure 14:
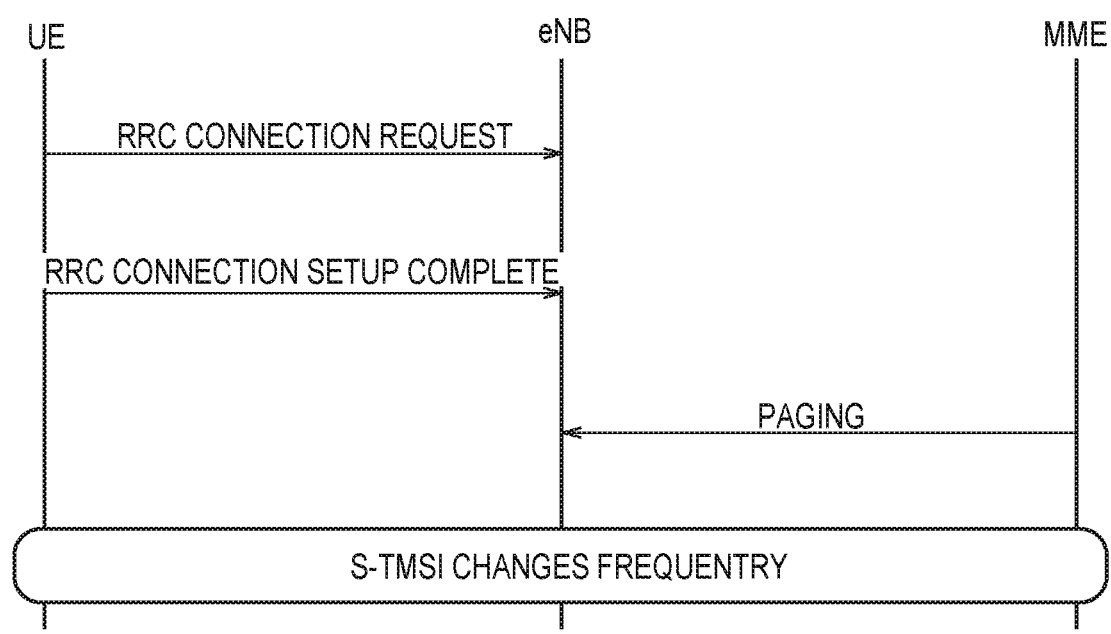
FIG. 14 is a diagram related to an additional note.

FIG. 14 illustrates existing messages containing S-TMSI.

(2.2. RAN Paging Area ID)

This is related to Discussion point 4 that "Should a new RAN-configured paging area identifier (ID) be considered as another option to define the RAN-configured paging area?".

The configured RAN paging area will be one of the following options.

a list of cells single cell the same as CN Tracking Area

FFS: paging area which can be indicated by ID

These options, including the "RAN paging area ID", could be considered as useful for different scenarios. For example, the network may use the "list of cells" if it needs flexible configurations for each UE, while the network may also use the "RAN paging area ID" when it wants to minimize the signalling overhead. So, it's preferable to introduce the one more option for RAN paging area configuration.

Proposal 2: RAN2 should introduce the broadcasted RAN paging area ID.

If Proposal 2 is agreeable, the question is whether multiple RAN paging area IDs is useful or not. For example, if the cell may belong to two RAN paging areas, e.g., a larger area and another smaller area, then the serving cell may select which RAN paging area is suitable for each UE, e.g., a high mobility UE may be configured with the larger area to avoid frequent notifications; or another stationary UE may be configured with the smaller area to reduce signalling overhead due to RAN paging. As another example, if it's assumed that only a single RAN paging area ID can be broadcasted per cell, it should still be possible to configure the UE with multiple RAN paging area IDs, so that effectively the UE's RAN paging area is the combination of all the individual areas. In both cases, UEs may be configured with different sizes of RAN paging area if needed. So, it's worth discussing whether or not to allow multiple RAN paging area IDs to be broadcasted and/or configured.

Proposal 3: RAN2 should discuss whether to allow multiple RAN paging area IDs (to be broadcasted and/or configured).

If it's decided that a single RAN paging area ID is only broadcasted and configured, i.e., Proposal 3 is not agreeable, it's not necessary to explicitly configure the UE with RAN paging area ID when it enters Light Connection, since it's obvious the RAN paging area ID to be configured is the same as the one broadcasted by the anchor eNB that sends the UE to Light Connection. Otherwise, some ping-pong may be concerned, e.g., if different RAN paging area ID from one broadcasted is configured to the UE then it should return to RRC Connected immediately to send the notification. So, RAN-PagingAreaInfo-r14 in the running CR of TS36.331 should contain an indication, e.g., "ran-pagingAreaId" defined as ENUMERATED {true}, rather than the ID itself.

Proposal 4: If a cell can only broadcast a single RAN paging area ID, the UE will implicitly use RAN paging area ID broadcasted by the "anchor eNB" that triggers the UE to go to Light Connection, without the explicit configuration of the RAN paging area ID.

Figure 15:
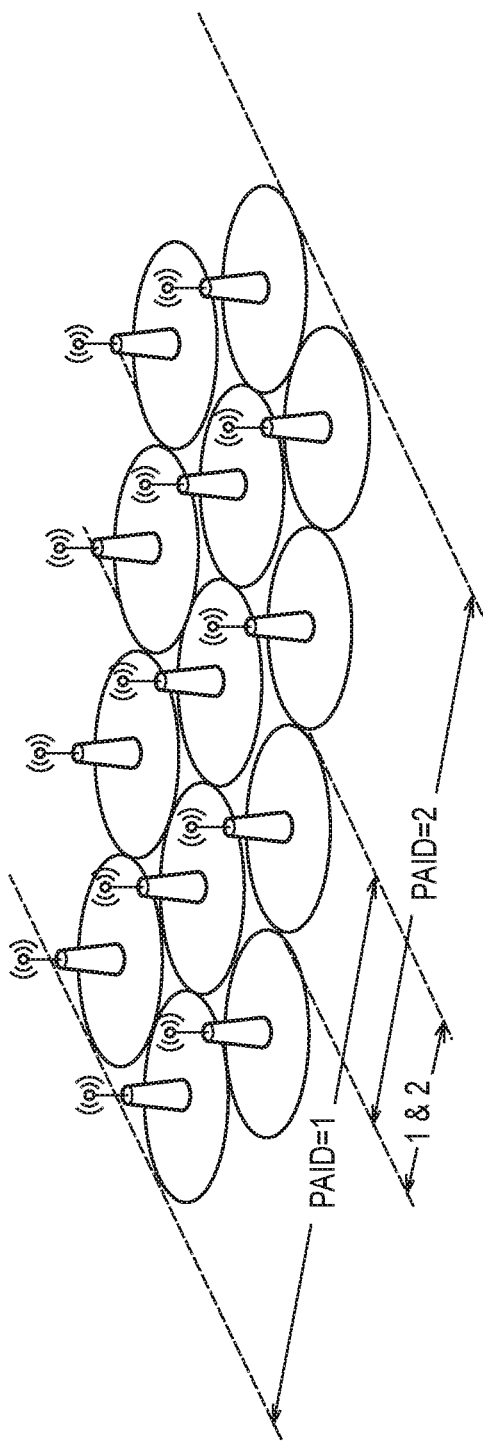
FIG. 15 is a diagram related to an additional note.

FIG. 15 illustrates multiple RAN paging area ID.

(2.3. Interaction with NAS)

Discussion point 8 that "Does the UE NAS need to be aware when the UE is in light RRC connection? please justify your response" seems to imply the possibility of some additional interaction between NAS and AS.

RAN2 agreed to go with Modelling A-2, i.e., RRC Connected-based model, which is beneficial in order to avoid the ECM state mismatch between the MME and the UE, i.e., to stay in ECM Connected. So, it could be assumed that NAS may just perform ECM Connected procedures as it is today, during the UE in Light Connection. In other words, Light Connection may be transparent from NAS's perspective. For example, when NAS signalling happens, AS just initiated RRC Connection Resume procedure to get back "full" RRC Connected state.

Observation 1: As the baseline, Light Connection is transparent from NAS's perspective.

However, there could be some abnormal case, such as RRC Connection Resume procedure is failed, i.e., when the UE receives RRC Connection Reject. It could be seen as "RRC Connection failure" condition from NAS's perspective, since it's just an error in AS. It seems well aligned with the information from CT1 that "Since Rel-8, CT1 has below TAU trigger (in TS 24.301, subclause 5.3.1.3) to re-establish the RRC connection for the UE in the EMM-CONNECTED mode based on the "RRC Connection failure" indication from the AS layer".

Considering the information that "CT1 needs more time to study in detail how to implement the fallback to RRC Connection establishment in the case of modelling A, but for the above reasons CT1 assume that the fallback will require an explicit interaction between AS and NAS. So it will probably be more similar to the above TAU trigger or a similar trigger for a service request specified in the current CT1 specification.", it should be avoided to specify additional functionality for similar mechanism, i.e., AS should just consider and inform of "RRC Connection failure" upon reception of RRC Connection Reject during the transition from Light Connection to RRC Connected.

Proposal 5: RAN2 should agree that AS informs NAS of "RRC Connection failure" when the UE fails to get back from Light Connection to "full" RRC Connected.

(2.4. Light Connection Support Indication)

Discussion point 9 was that "Does the eNB need to broadcast a light RRC connection? please justify your response.", since it's still FFS that "UE should know whether a UE lightly connected function is supported or not in the cell." It could be assumed that the UE in Light Connection is "Performing cell reselection based mobility, the same cell reselection mechanism in RRC IDLE", as long as all the eNBs in a network support the return from Light Connection to RRC Connected. On the other hand, although It might be up to NW implementation, Rel-13 didn't assume all eNBs in a network supports the new features, so it had the indication whether each new feature is allowed to be initiated, e.g., eDRX-Allowed for eDRX, voiceService-CauseIndication for VoLTE Establishment Cause, up-CIoT-EPS-Optimisation and cp-CIoT-EPS-Optimisation for RRC Connection Resume and data over NAS respectively.

There is two possible cases that the UE initiates the RRC Connection Resume during in Light Connection, i.e., for return to "full" RRC Connected and for RAN paging area update (PAU). The former case may not be possible if RAN paging area does not include the cells which don't support Light Connection, but the latter case is still problematic. The UE would initiate a special RRC Connection Resume procedure for PAU whenever it enters the cell outside of RAN paging area, i.e., "RRC Connection Resume procedure triggered by AS for PAU shall include additional indication for PAU", but still the UE does not know whether the cell is acceptable to receive the PAU procedure or not. So, the UE should be informed in SIB whether the cell supports Light Connection or not.

Proposal 6: RAN2 should introduce an indication in SIB2 if the cell supports Light Connection, i.e., if the UE is allowed to send an RRC Connection Resume Request during in Light Connection.

If Proposal 6 is agreeable, the question is how the UE in Light Connection should behave when it enters the cell belonging to such an eNB, since the UE may become unreachable from RAN-initiated paging for MT call and/or may not initiate RRC Connection Resume for MO call.

One of possible solutions could be considered in the cell reselection procedure. For example, the UE may prioritize the cell supporting Light Connection, whereby the cell may be determined by e.g., the configured RAN paging area (with the list of cells) or the SIB indication (Proposal 6). This enhancement is expected to avoid the problematic condition as much as possible, e.g., in case that only one frequency layer does not support Light Connection. So, the UE should be allowed to prioritize the cell supporting Light Connection, in the cell reselection during in Light Connection.

Proposal 7: RAN2 should agree that the UE is allowed to prioritize the cell supporting Light Connection in the cell reselection procedure.

Even if Proposal 7 is applicable, it's still possible that the UE in Light Connection eventually reselects the cell which does not support Light Connection, e.g., since no cell supporting Light Connection is found on the UE's location. In this case, the UE in Light Connection should autonomously transition to RRC IDLE, and possibly AS informs NAS of "RRC Connection failure" to trigger the NAS Recovery, similar to the failure case discussed in section 2.3. In addition, it should be also discussed when the UE needs to transition to IDLE, i.e., whether immediately or only upon MO signalling/data happens or MT access received.

Option 1: Transition to IDLE immediately whenever the UE enters the cell not supporting Light Connection:

Pros: It's the simplest behaviour, from the UE point of view.

Cons: The opportunity staying in Light Connection may be minimized; therefore, the additional signalling, to transition from IDLE to RRC Connected and also for NAS Recovery, is required whenever the UE goes through the cell not supporting Light Connection.

Option 2: Transition to IDLE only upon MO/MT call happens in the cell not supporting Light Connection:

Pros: The UE may continue keeping in Light Connection, unless MO/MT call happens in the cell not supporting Light Connection.

Cons: The UE in Light Connection needs to monitor the legacy paging, i.e., IMSI or S-TMSI in the paging message, like as in IDLE.

Alternatively, it could be also possible that the UE takes the action before the cell reselection, as follows;

Option 3: Initiate RRC Connection Resume before it reselects a cell not supporting Light Connection:

Pros: The (anchor) eNB controls the UE's transition of RRC states. It's also expected to minimize the latency for call re-setup, comparing to the other options. Additionally, the (anchor) eNB may determine the necessity of the UE context (i.e., either remove the context or transfer the context).

Cons: The duration in Light Connection may be shortened, similar to Option 1. Some extra standardization efforts may be necessary, e.g., the serving cell may provide the list of neighbouring cells not supporting Light Connection and the UE may need to inform the eNB when it is about to reselect to a cell not supporting Light Connection using the RRC Resume procedure etc.

Considering the objective of this WI[11], Option 2 is preferable for signalling reduction.

Proposal 8: RAN2 should agree that the UE in Light Connection should transition to IDLE (and/or AS informs NAS of "RRC Connection failure") upon MO/MT call happens, when it's in the cell not supporting Light Connection.

Although it's not a problem with Option 3, for Options 1 and 2 it needs to be assumed that some sort of "fallback" mechanism of RAN-initiated paging in the NW, e.g., the "anchor eNB" asks the MME to initiate S1 PAGING when it notices RAN-initiated paging to the UE is unreachable, since the eNB does not support Light Connection anyway.

Proposal 9: RAN2 should discuss whether the "fallback" mechanism to the legacy paging is necessary.

Figure 16:
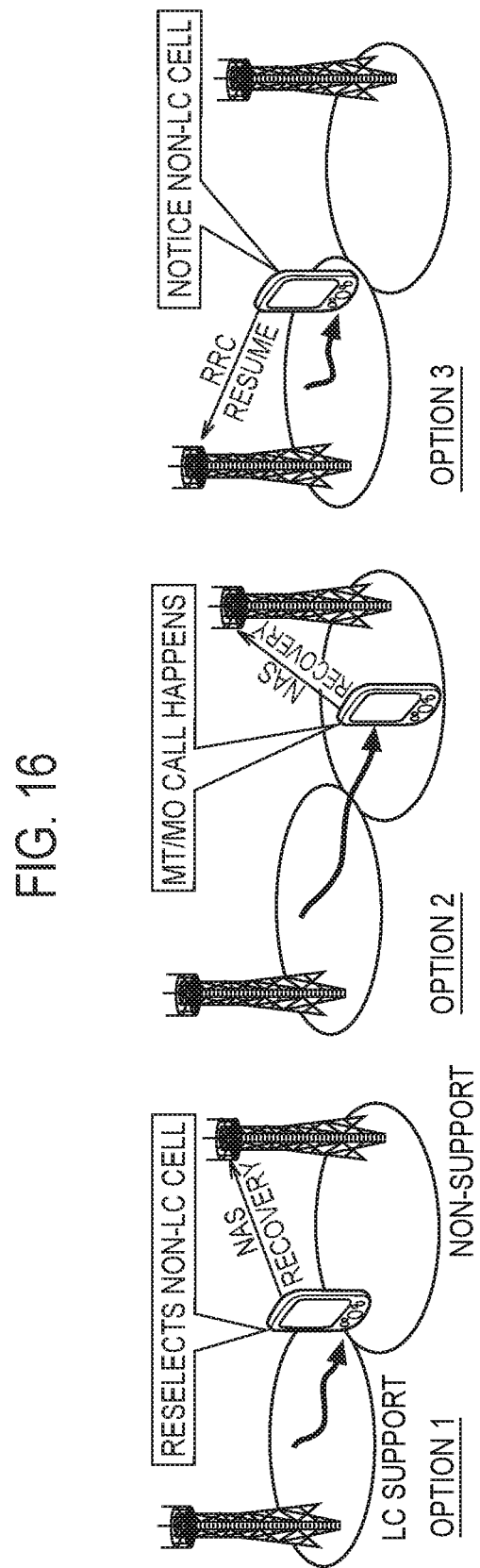
FIG. 16 is a diagram related to an additional note.

FIG. 16 illustrates options of UE behaviour for cell not supporting Light Connection.

(2.5. Paging Occasion (IMSI Mod x))

It was agreed that "The UE ID (IMSI mod x) is used for PO/PF calculation in RAN-based paging". However, it's still unclear how the eNB knows the IMSI of a specific UE in Light Connection, in order to determine the PF/PO of the UE. Currently it can be known when the eNB receives S1 PAGING, i.e., "(Extended) UE Identity Index Value" which is UE_ID, i.e., IMSI mod 1024 or 4096. However, it's somewhat strange that the eNB has to ask the MME to send the message, whenever the eNB wants to send RAN-initiated paging to the UE in Light Connection.

Observation 2: It's still unclear how the eNB determines PF/PO of the UE in Light Connection.

The three alternatives could be considered as follows.

Alternative 1: The eNB gets "UE Identity Index Value" from the MME, when it makes the UE to enter Light Connection.

Alternative 2: The UE informs the eNB of either its IMSI or UE_ID.

Alternative 3: The eNB comprehends the UE's IMSI within NAS PDU, e.g., ATTACH REQUEST.

Alternative 1 is similar to the current concept, i.e., "(Extended) UE Identity Index Value" is managed and provided by the MME. However, it's somewhat conflict with the WI objective that "Signalling reduction to CN over S1 interface due to mobility and state transitions by hiding them from CN", and also it needs the additional standardization efforts in the other WG.

Alternative 2 may be decided within RAN2, but the issue is which message should convey the information. Usually, it may be natural to inform of IMSI or UE_ID when the UE enters Light Connection, i.e., to use "Complete" message, but it's already agreed to go with RRC Connection Release procedure which does not have the response message. Another possibility is to use UE Information procedure or UE Capability Transfer procedure, but it requires that the eNB always Request/Enquiry to get the information.

Alternative 3 relies on the implementation, so a minimum impact on the specifications is expected. However, it's unclear if it could be acceptable to assume such an implementation, i.e., cross-layer interaction.

Although these alternatives have pros and cons, Alternative 2 may be preferable in order to complete the WI by the deadline.

Proposal 10: RAN2 should agree that the UE may inform the eNB of either its IMSI or UE_ID, in order for the eNB to determine the PF/PO.

Proposal 11: RAN2 should discuss which message to be used for the information transfer.

Additionally, it's necessary for the "anchor" eNB to transfer the IMSI, UE_ID or "UE Identity Index Value" to the other eNB, when a MT call happens to the UE in different eNB's coverage, e.g., via "X2 PAGING".

Observation 3: The IMSI or UE_ID needs to be transferred from the "anchor" eNB to the other eNB during RAN initiated paging process.

(2.6. Awareness of Data Inactivity During RRC Connected)

Since "A UE enters into "lightly connected" by RRC signalling", the serving cell needs to determine when to trigger the UE to enter Light Connection. One of the possible implementations is for the serving cell to monitor the traffic behaviour and trigger the UE to enter Light Connection due to the UE's inactivity for a period of time. Since this mechanism relies on the expected traffic behaviour, if the estimation of the expected traffic is inaccurate then the signalling overhead may actually increase, e.g., due to frequent transitions between Light Connection and RRC Connected, or the chance to entering Light Connection is missed. While expected MTC-type traffic can be easily estimated, LTE-type traffic, esp. smartphone's traffic behaviour, may not be as easy for the NW to predict. Therefore, it may be necessary for the UE to provide some assistance information since the UE has a better knowledge/control of its traffic behaviour. So, it's worth considering whether the serving cell may configure the UE to provide certain assistance information to allow the eNB to make a better decision to trigger the UE to Light Connection.

Proposal 12: RAN2 should discuss whether the serving cell may configure the UE to provide assistance information to allow the eNB to make a better decision on when to trigger the UE to enter Light Connection.

If Proposal 12 is agreeable, the assistance information may have some similarity to the existing Power Preference Indicator (PPI) and/or MBMS Interest Indication (MII). With PPI, the UE may inform of lowPowerConsumption when its power consumption is preferred to be optimized by e.g., longer DRX cycle. The MII was used to inform of the MBMS frequencies of interest and the priority between Unicast and MBMS e.g., when the handover to the frequency is preferred. In this case, the UE may inform the serving cell when it is appropriate for the UE to enter Light Connection; in other words, the UE may send the assistance information when the data transmission/reception has been or will be inactive within a certain duration. The details and necessity of any additional assistance are FFS, e.g., UE's expected inactive time.

Proposal 13: RAN2 should consider if the UE should send the assistance information upon data inactivity.

The invention claimed is:

1. A base station used in a mobile communication system, comprising:
a controller configured to,
cause a user equipment to transition from a RRC (radio resource control) connected state to a specific state in which a paging area is configured in the user equipment from the base station, transmit a resume identifier used for resuming a RRC connection of the user equipment, to the user equipment when causing the user equipment to transition from the RRC connected state to the specific state, perform a paging for the user equipment by the base station with another base station that corresponds to the paging area, when the base station receives a non-access stratum signaling from a core network to the user equipment, transmit, to the another base station, a paging request message for paging the user equipment, the paging request including the resume identifier and information indicating DRX configuration configured from the base station to the user equipment, receive, from the another base station, first information indicating that the another base station has failed in paging the user equipment, and transmit, to the core network, a failure notification indicating the failure of the paging.

2. A method performed at a base station in a mobile communication system, comprising:

causing a user equipment to transition from a RRC (radio resource control) connected state to a specific state in which a paging area is configured in the user equipment from the base station;

transmitting a resume identifier used for resuming a RRC connection of the user equipment, to the user equipment when causing the user equipment to transition from the RRC connected state to the specific state;

performing a paging for the user equipment by the base station with another base station that corresponds to the paging area, when the base station receives a non-access stratum signaling from a core network to the user equipment;

transmitting, to the another base station, a paging request message for paging the user equipment, the paging request including the resume identifier and information indicating DRX configuration configured from the base station to the user equipment;

receiving, from the another base station, first information indicating that the another base station has failed in paging the user equipment; and transmitting, to the core network, a failure notification indicating the failure of the paging.

* * * * *